(12) United States Patent
Judkins et al.

(10) Patent No.: US 11,823,165 B2
(45) Date of Patent: Nov. 21, 2023

(54) ASSOCIATING PRIOR ARRANGEMENTS WITH ON-PREMISE MANUAL TRANSACTIONS AND CONCOMITANT PRESENCE OF ACTOR'S PRESENCE-ADVERTISING EMITTER IN FINE RESOLUTION REGION

(71) Applicant: Radius Networks Inc., Washington, DC (US)

(72) Inventors: Timothy Judkins, Vienna, VA (US);
David Helms, Arlington, VA (US);
Scott Yoder, Washington, DC (US);
Francis Nguyen, Chicago, IL (US);
Marc Wallace, Arlington, VA (US)

(73) Assignee: Radius Networks, Inc., Washington, DC (US)

( * ) Notice: Subject to any disclaimer, the term of this patent is extended or adjusted under 35 U.S.C. 154(b) by 134 days.

(21) Appl. No.: 16/783,087

(22) Filed: Feb. 5, 2020

(65) Prior Publication Data

US 2021/0241257 A1     Aug. 5, 2021

(51) Int. Cl.
*G06Q 20/32*     (2012.01)
*G06Q 30/0207*     (2023.01)
(Continued)

(52) U.S. Cl.
CPC ..... *G06Q 20/3224* (2013.01); *G06Q 30/0209* (2013.01); *G06Q 30/0212* (2013.01);
(Continued)

(58) Field of Classification Search
CPC ........... G06Q 20/3224; G06Q 30/0236; G06Q 30/0212; G06Q 30/0209; G06Q 30/0261; G06Q 20/325; G06Q 30/0224; G06Q 30/0267; G06Q 50/265; G06Q 20/20; G06Q 30/0631; G06Q 20/18; G06Q 20/32; G06Q 20/322; G06Q 20/3255; G06Q 20/327; G06Q 20/3278; G06Q 20/34; G06Q 30/02; G06Q 20/343; G06Q 30/06; G06Q 20/40;
(Continued)

(56) References Cited

U.S. PATENT DOCUMENTS

| | | |
|---|---|---|
| 5,976,038 A | 11/1999 | Orenstein et al. |
| 8,326,260 B1 | 12/2012 | Bradish et al. |

(Continued)

FOREIGN PATENT DOCUMENTS

| | | |
|---|---|---|
| CN | 106352884 A | 1/2017 |
| EP | 1143260 A2 | 10/2001 |
| WO | WO2015042065 A1 | 3/2015 |

OTHER PUBLICATIONS

Grocery Retail Online, "ShopperKit Adds FlyBuy Pickup to Create Seamless Curbside Experience", Aug. 13, 2019, https://www.groceryretailonline.com/doc/shopperkit-adds-flybuy-pickup-to-create-seamless-curbside-experience-0001.

(Continued)

*Primary Examiner* — Chinyere Mpamugo
(74) *Attorney, Agent, or Firm* — Lee & Hayes, P.C.

(57) ABSTRACT

Prior arrangement information is automatically fetched in response to detection that a radio presence advertising mobile device of a user is disposed in a region of interest that is operatively adjacent to a transaction-processing location. The fetched information is used to automatically modify the transaction.

20 Claims, 12 Drawing Sheets

(51) Int. Cl.
*G06Q 30/0251* (2023.01)
*H04W 4/021* (2018.01)

(52) U.S. Cl.
CPC ..... *G06Q 30/0236* (2013.01); *G06Q 30/0261* (2013.01); *H04W 4/021* (2013.01)

(58) Field of Classification Search
CPC .............. G06Q 30/0601; G06Q 50/12; G06Q 30/0207–0277; H04W 4/021; H04W 4/80; H04W 4/023; H04W 4/21; H04W 84/12; H04W 48/12; H04W 4/30; G06F 16/29; G06F 16/9535; G06F 16/9537; G06F 3/017; G06F 3/0346; H04L 51/04; H04L 67/00; G07F 7/1008; G07F 7/00; G07F 7/02; H04B 7/06; G01S 3/04; G01S 3/30; G01S 5/04

See application file for complete search history.

(56) References Cited

U.S. PATENT DOCUMENTS

| | | | |
|---|---|---|---|
| 8,989,094 B2 | 3/2015 | Bradish et al. | |
| 9,135,615 B1* | 9/2015 | Mutha | G06Q 20/325 |
| 9,251,528 B1* | 2/2016 | McGhie | G06Q 20/381 |
| 9,373,091 B1 | 6/2016 | Belser et al. | |
| 9,408,060 B2 | 8/2016 | Helms et al. | |
| 9,645,222 B2 | 5/2017 | Carey et al. | |
| 10,484,831 B1 | 11/2019 | Helms et al. | |
| 2005/0049940 A1 | 3/2005 | Tengler et al. | |
| 2005/0197158 A1 | 9/2005 | Silverbrook et al. | |
| 2005/0204061 A1 | 9/2005 | Farchmin et al. | |
| 2006/0061476 A1 | 3/2006 | Patil et al. | |
| 2007/0042716 A1 | 2/2007 | Goodall et al. | |
| 2009/0307143 A1 | 12/2009 | Reistad et al. | |
| 2013/0080218 A1 | 3/2013 | Wildern, IV et al. | |
| 2013/0260782 A1 | 10/2013 | Un et al. | |
| 2013/0290096 A1* | 10/2013 | Lizotte, III | G06Q 30/0246 705/14.45 |
| 2014/0046802 A1 | 2/2014 | Hosein et al. | |
| 2014/0122040 A1 | 5/2014 | Marti | |
| 2014/0247279 A1 | 9/2014 | Nicholas et al. | |
| 2014/0274136 A1 | 9/2014 | Edge et al. | |
| 2014/0370917 A1* | 12/2014 | Buchheim | H04W 4/026 455/456.1 |
| 2015/0149307 A1 | 5/2015 | Thukral | |
| 2015/0186941 A1 | 7/2015 | Anthony et al. | |
| 2015/0215762 A1 | 7/2015 | Edge | |
| 2016/0192130 A1 | 6/2016 | Kahn et al. | |
| 2016/0335484 A1 | 11/2016 | Xie et al. | |
| 2016/0337796 A1 | 11/2016 | Pandharipande et al. | |
| 2017/0055112 A1 | 2/2017 | Westphal et al. | |
| 2017/0075518 A1 | 3/2017 | Ramakrishna et al. | |
| 2017/0083893 A1 | 3/2017 | Beyer et al. | |
| 2017/0234978 A1 | 3/2017 | Shvodian et al. | |
| 2017/0156042 A1 | 6/2017 | Kwan et al. | |
| 2017/0228732 A1 | 8/2017 | Badenhorst | |
| 2017/0265046 A1 | 9/2017 | Chen et al. | |
| 2018/0048996 A1 | 2/2018 | Ciecko | |
| 2018/0075518 A1 | 3/2018 | Werbitt | |
| 2018/0096122 A1 | 4/2018 | Turner et al. | |
| 2018/0189901 A1* | 7/2018 | Poisner | G06Q 50/12 |
| 2019/0080384 A1 | 3/2019 | Radcliffe et al. | |
| 2019/0297454 A1 | 9/2019 | Smith et al. | |
| 2019/0361463 A1 | 11/2019 | Nelson et al. | |
| 2021/0190928 A1 | 6/2021 | Helms et al. | |

OTHER PUBLICATIONS

Skip, "Checkout on Your Phone", 2018, downloaded from Internet on Feb. 5, 2020, https://getskip.com/.

Anne D'Innocenzio, "Why Scan-and-Go Technology Is Surging in More Grocery Stores", Feb. 23, 2018, https://www.inc.com/associated-press/supermarket-chain-stores-new-technology-scan-go-customers-amazon-phone-app.html.

Nancy Parode, "How to Use the Airport's Self-Service Check-In Kiosks", Nov. 26, 2019, https://www.tripsavvy.com/airports-self-service-checkin-kiosks-2973028.

Electronicsnotes, "Yagi Antenna/Yagi-Uda Aerial", downloaded from Internet on Feb. 5, 2020, https://www.electronics-notes.com/articles/antennas-propagation/yagi-uda-antenna-aerial/basics-overview.php.

Xirio Online, "Radio Receiver/Terminal Parameters", downloaded from Internet on Feb. 5, 2020, https://www.xirio-online.com/help/en/rx_radio_params.html.

Wikipedia, "Antenna (radio)", downloaded from Internet on Feb. 5, 2020, https://en.wikipedia.org/wiki/Antenna_(radio)#Characteristics.

Office Action filed Dec. 10, 2020 in European Patent Application No. 18706899.4, 8 pgs.

European Office Action dated Jun. 24, 2021 for European Patent Application No. 18706899.4, a foreign counterpart to U.S. Pat. No. 10,531,229, 9 pages.

International Preliminary Report and Written Opinion dated Aug. 6, 2019, in PCT Application No. PCT/US2018/016336, 10 pgs.

Office Action for U.S. Appl. No. 16/681,559, dated Aug. 9, 2021, Helms, "Wireless Locator System", 56 Pages.

Final Rejection dated Nov. 7, 2018 in U.S. Appl. No. 15/884,132, 22 pgs.

Non-Final Rejection dated Mar. 26, 2019 in U.S. Appl. No. 15/884,132, 20 pgs.

Non-Final Rejection dated Apr. 13, 2018 in U.S. Appl. No. 15/884,132, 15 pgs.

The PCT Search Report and Written Opinion dated Mar. 31, 2021 for PCT Application No. PCT/US2020/066769, 18 pages.

* cited by examiner

204

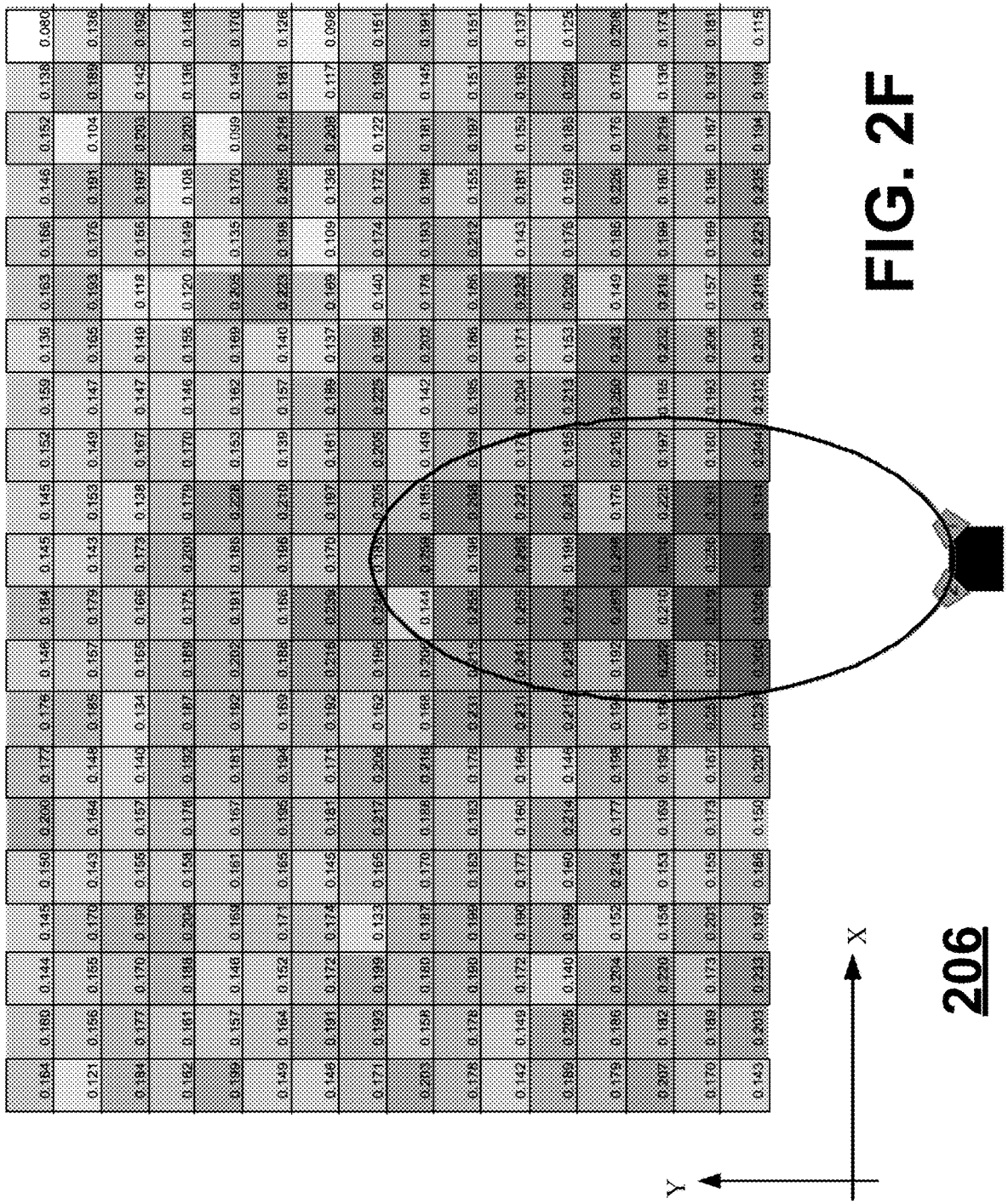

ASSOCIATING PRIOR ARRANGEMENTS WITH ON-PREMISE MANUAL TRANSACTIONS AND CONCOMITANT PRESENCE OF ACTOR'S PRESENCE-ADVERTISING EMITTER IN FINE RESOLUTION REGION

CROSS REFERENCE

The disclosures of the following US applications are incorporated herein by reference in their entireties: (1) U.S. Provisional Application No. 62/453,872, filed Feb. 2, 2017; (2) U.S. patent application Ser. No. 15/884,132, filed Jan. 30, 2018 originally entitled "WIRELESS LOCATOR SYSTEM" and claiming priority to said Provisional Application No. 62/453,872; (3) U.S. patent application Ser. No. 16/232,849 filed Dec. 26, 2018 originally entitled LOCAL EPHEMERAL LOCATION TRACKING OF MOBILE DEVICE USERS; (4) U.S. patent application Ser. No. 16/265,786 filed Feb. 1, 2019 originally entitled "Location Sensitive Queues Management"; and (5) U.S. patent application Ser. No. 16/725,262 filed Dec. 23, 2019 originally entitled "High Confidence Isolated Presence Detection In Fine Resolution Region".

BACKGROUND

There is a growing demand for customer-centric online pre-ordering, online discount coupon clipping, online loyalty points collection, online appointment/reservation processing as well as for timely and coordinated servicing of on-premise actions by the same customers (or by agent/actors acting on their behalf) after they had made their prior arrangements (e.g., conducted online transactions or loyalty membership) that should affect their on-premise transactions (e.g., by providing a discount based on online acquired coupons). In other words, providers are under pressure to provide requested goods and/or services in timely and high quality manner to online requestors who subsequently become on-premise customers/actors. Part of this pressure includes properly co-associating the on-premise customers with their previous online made appointments, reservations, coupon clippings, loyalty point accumulations and/or other prior online or off-line transactions. At the same time providers of goods and/or services often have to cope with surges and ebbs in volume of arriving orders/appointments and variations in resources at hand for satisfying customer/patron requests as well as coping with fluctuating flows of patron traffic in and out of their establishments. Customer relations may suffer if a patron is made to wait for unexpected long times, has expectations ignored, is asked to accept inferior servicing or has his/her order mixed up with that of another.

By way of a nonlimiting example, a fast food restaurant may feature a drive through ordering position or a walk-up self-service kiosk by way of which customers can manually place orders or modify prior orders (e.g., by verbally placing their orders or order modifications and/or manually operating a touch screen and/or input buttons (e.g., keyboard) and/or making machine-recognized hand or head gestures). The fast food restaurant may further feature a subsequently-visited drive through payment collection window or walked-to counter at which customers can pay for ordered items. (In the case of self-serve kiosks, payments may be made there.) The payment process may involve the redeeming of pre-clipped online coupons and/or redeeming accumulated customer loyalty points and/or accumulating more loyalty points. Customers may become upset if these are not honored. The fast food restaurant may yet further feature a subsequently positioned quick-pickup window or counter at which customers can pick up their respectively ordered and paid for items. However, if customers are made to wait too long at the respective ordering positions, payment spots and pick-up areas; or if their orders get mixed up with those of others or fail to be fully satisfied, or if their expectations with respect to redeeming coupons, redeeming or accumulating more customer loyalty points or the like are not met they may become discouraged and not return to the establishment in the future. Sometimes the problem is due to customers arriving at odd hours when service staff are not expecting them and service staff not being aware that a customer is impatiently waiting at a critical spot (e.g., ordering position, payment spot, item pickup window). Other times, the problem is due to too many customers arriving all at once and creating a tightly packed queuing situation. It is desirable to accurately detect presence of each customer at critical locations (e.g., order placing spots and pickup areas) without mixing them up with other customers in both times of crowding and in sparse times and to take corresponding immediate action for that individual customer. It is also important to make sure that respective prior arrangements made by the customer (e.g., prior online or off-line transactions) are honored at the time and place of taking an on-premise order or an on-premise payment transaction or at the time of making an on-premise delivery of corresponding goods/services.

One method of detecting customer presence at a place where an on-premise transaction can take place involves detecting presence of a beacon signal repeatedly broadcast from a customer possessed device such as a customer's cell phone (or smartwatch or other beacon emitter). More specifically, when Bluetooth is enabled in the customer's cell phone, the cell phone will repeatedly output a Bluetooth beacon signal that broadcasts the presence of that Bluetooth device in the vicinity together with a relatively unique identity. However, determining the presence of the user and their cell phone in a specific vicinity based on received beacon signals can be an inconsistent and inaccurate endeavor when the received signal is reflected and/or attenuated and/or otherwise affected by various external factors including how the cell phone is being held by the customer, what position the customer is relative to radio signal reflectors and/or attenuators such as may be found within a vehicle and other such external factors. Transactions may be improperly carried out if the beacon signal is not properly detected or is confused with radio signals from nearby other devices. Solutions are needed both for accurately detecting of a presence-advertising radio emitter in or operatively adjacent to critical transaction-processing spots and for making sure that prior arrangements made by/for the customer are honored at the time of the on-premise transaction.

It is to be understood that some concepts, ideas and problem recognitions provided in this description of the Background may be novel rather than part of the prior art.

BRIEF SUMMARY

In one embodiment, there is provided a method that includes automatically associating prior arrangements with a transaction conducted by way of a transaction-processing location where the method comprises: (a) determining a degree of correlation between respective reception characteristics of two or more respective radio presence advertising signals (PA-signals or PAS's) respectively received at a substantially same time by two or more of co-located directional antennas aimed to cover a fine resolution region of interest within or operatively adjacent to the transaction-processing location; (b) in response to the determined degree of correlation satisfying a predetermined threshold, obtaining from an emitter (PAS emitter) of the received PA-signals, an identification of a transactor associated with the PAS emitter and/or an identification of at least one transaction associated with the PAS emitter; (c) using at least one of the one or more identifications obtained from the PAS emitter to obtain specifications for prior arrangements made in association with the transaction conducted by way of the transaction-processing location; and (d) automatically applying to the transaction conducted by way of the transaction-processing location, those of the obtained prior arrangements that relate to the transaction.

In one embodiment, a machine-implemented method is used that provides high confidence presence detection of a radio emitter of a repeatedly broadcast presence-advertising signal (herein "PAS" and also "PA-signal") despite potential variations in how signals are transmitted between a specific region of interest and the detector. The PAS could be a Bluetooth beacon signal or another beacon signal. Any repeatedly broadcast radio signal that can be detected as specifically indicating presence of its emitter in a relevant finite area can serve as a PAS. In one embodiment, the machine-implemented method comprises: (a) simultaneously receiving at two or more co-located directional antennas that are coupled to respective radio receivers, a PA-signal that has been broadcast from a PAS emitter that is disposed in a region of interest within or operatively adjacent to a transaction-processing location (e.g., a customer-operated kiosk), the region of interest being one that in one embodiment is overlapped by partial parts of reception sensitivity lobes of the directional antennas; (b) obtaining signal strength indications (e.g., RSSI's) from the respective radio receivers; (c) producing a difference signal representative of a difference between two of the obtained signal strength indications of the respective antennas; (d) producing an average signal representative of a running average of two or more of the obtained signal strength indications; (e) producing a normalized signal strength signal using a ratio that includes the difference signal on one side of the ratio (e.g., the numerator side) and the average signal on an opposed side of the ratio (e.g., the denominator side); (f) generating a confidence signal based on the normalized signal strength signal, the confidence signal indicating a level of confidence that the PAS emitter is disposed inside the region of interest or alternatively indicating a level of confidence that the PAS emitter is disposed outside the region of interest; and (g) taking an action or avoiding an action based on the confidence signal. In one embodiment, the action includes automatically associating a user and/or an order for a product and/or a service with a unique identification provided by or assigned to the PA-signal of the PAS emitter that is disposed in the region of interest, where the action includes determining if there are one or more respective prior arrangements made by or for the user/customer (e.g., prior online or off-line transactions) and associating relevant ones of those prior arrangements with the transaction conducted (e.g., about to take place or taking place) by way of the transaction-processing location. (In a case where the transaction-processing location is limited to the housing of a self-serve kiosk, the PAS emitter may be located in a spot where the possessor (e.g., customer) of the emitter is disposed in a position where the possessor can operate the self-serve kiosk and is thus operatively adjacent to that kiosk.)

In one embodiment, there is provided a machine system that automatically associates prior arrangements with a transaction taking place by way of a transaction-processing location, where the system comprises: (a) two or more co-located directional antennas structured to receive radio presence advertising signals ("PA-signals" or "PAS's") repeatedly broadcast from a radio PAS emitter and to relay the received signals to one or more respective radio receivers used for demodulating the received signals, the co-located directional antennas being directed to cover a predetermined fine resolution region of interest within or operatively adjacent to the transaction-processing location; (b) respective signal strength measuring circuits in the respective one or more radio receivers, the measuring circuits structured to determine corresponding strengths of the radio PA-signals that were received at a substantially same time by two or more of the co-located directional antennas; (c) a first generator structured to generate from the determined strengths, a current strength difference signal for at least one pair of the two or more respective radio PA-signals that were received at a substantially same time by two or more of the co-located directional antennas, the generated current strength difference signal indicating a difference between a first of the determined corresponding strengths, that is optionally weighted, and a second of the determined corresponding strengths, that is optionally weighted; (d) a second generator structured to use the generated current strength difference signal to generate a confidence signal that indicates the likelihood of presence of the radio PAS emitter within the predetermined fine resolution region of interest; (e) an identification extractor responsive to the second generator and structured to obtain from the PAS emitter an identification of a transactor associated with the PAS emitter and/or an identification of at least one transaction associated with the PAS emitter in response to the generated confidence signal satisfying a predetermined threshold; and (f) a prior-arrangements associator responsive to the identification extractor and structured to use one or more of the identifications obtained from the PAS emitter while it is determined to be located in the fine resolution region and to associate specifications for prior arrangements made in association with a transaction that is taking place or shortly will take place by way of the transaction-processing location and to automatically apply those of the associated prior arrangements that relate to the transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 2F depicts a commonality reception heat map for the XY grid map of the region adjacent to the first and second divergent directional antennas of FIGS. 2D and 2E where the commonality reception heat map indicates grid boxes that had substantially same reception signal strengths.

DETAILED DESCRIPTION

Figure 1:
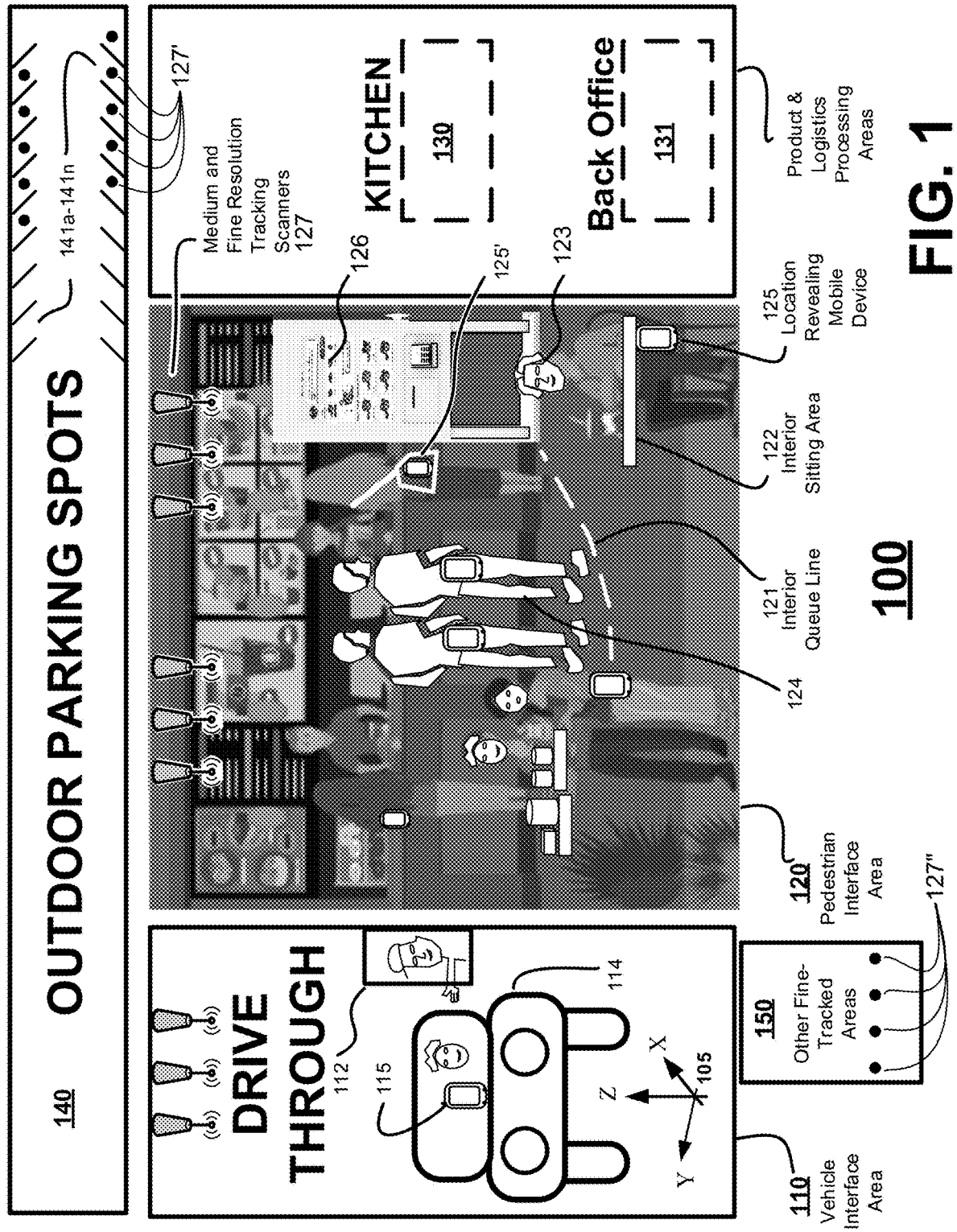
FIG. 1 is a schematic diagram of an environment in which high confidence isolated presence detection can be can be desirable despite variations in transmission factors for a radio presence-advertising signal transmitter (PAS transmitter) in a desired region of interest.

The disclosure relates to technology using resources of wireless networks and personal mobile communicators to detect presence of expecting recipients of goods and/or services and to provide high confidence isolated presence detection of a repeatedly broadcast radio PA-signal associated with a recipient in a fine resolution region (e.g., a 1×2 meter or smaller region) despite variations in how signals are transmitted from that region to a receiver. The disclosure also relates to co-associating prior arrangements made by/for the customer/recipient (e.g., an automatic 10% discount due to membership in a specific organization or identifying a prepaid order for pickup) with on-premise actions taken at or adjacent to a critical fine resolution area (e.g., ordering at a drive-by speaker or microphone and having the prior arrangement (of for example, the 10% discount) automatically applied for the quoted price) at the time and place of the on-premise actions. More specifically, the variation in signal transmission factors for that region may be due to the disposition of the personal mobile communicator (e.g., the customer's PAS broadcasting device, for example their smartphone) in a transmission attenuating and/or reflecting location such as within the metallic frame of a vehicle and/or the orientation of the personal mobile communicator or other such factors (e.g., disposed under a metal tray or metal table). The disclosure provides methods for nonetheless determining with confidence that the mobile communicator is inside the critical region and then responsively co-associating prior arrangements made by/for the customer/recipient and/or an associated order with respect to a transaction-processing action taken in association with that critical region and honoring those prior arrangements.

In one embodiment, a mobile wireless device normally or routinely carried by the recipient (e.g., the recipient's smartphone, smart watch or other such routinely carried or worn mobile device) is used to keep track of the location of the recipient, to keep track of prior arrangements made by/for the customer/recipient and in particular to detect high likelihood of presence of the recipient in critical location such as presence adjacent to an order placing microphone or speaker and responsively honoring the tracked prior arrangements that were made and are applicable at the critical location. High likelihood of presence is discussed here rather than absolute sureness of presence because noise in a low SNR situation can interfere with presence detection. A strong second emitter can interfere with detection of a specific first emitter. One way of reducing doubt that only a specific PAS emitter is disposed inside of a fine resolution region of interest is by double checking (or triple or greater checking) for substantial identity of (substantial correlation between) reception characteristics at a same or substantially same time by two or more co-located but independent antennas that are oriented to receive radio signals from the fine resolution region of interest. Substantial identity of substantially cotemporaneous reception characteristics can include: (a) same or substantially same received signal strengths; (b) same or substantially same received signal polarizations; (c) same or substantially same directions of receipt of a transmitted radio signal; (d) same or substantially same ratio of meaningful content versus noise (SNR) in the substantially contemporaneously received signals; and of course (e) same or substantially same meaningful content (the "S" in SNR) in the substantially contemporaneously received signals. In addition to this, the present disclosure also relates to management of queuing resources for accommodating traffic flows of expected recipients of goods/services as the recipients make their way to and through respective goods/services provisioning waiting lines (e.g., drive-through windows, payment windows, pick-up areas, counter lines and waited-on seating areas) where the concentration of the recipients in that area can produce radio interference and thus relatively low signal-to-noise ratios (SNR's). By double checking (or triple or greater checking) for substantial correlation between reception characteristics at a same or substantially same time of signals received by way of two or more co-located but independent antennas (e.g., directional antennas) that are oriented to receive radio signals from the same fine resolution region of interest, a method in accordance with the present disclosure can reduce doubt that the received signals (e.g., repeatedly broadcast PA-signals) are from one specific PAS emitter that is disposed inside of a fine resolution region of interest from which the independent antennas receive their signals. In one embodiment, the double/greater-checked for reception characteristics include (a) same or substantially same received signal strengths. In the same or another embodiment, the double/greater-checked for reception characteristics include (b) same or substantially same received signal polarizations. A unique (and optionally ephemeral) transaction/transactor identification (T/TID) is assigned to the prior arrangements made before the associated on-premise actions take place. (The T/TID may uniquely identify for the premises where the transaction takes place, either the transactor or the associated transaction (e.g., order for goods/service) or both.)

For sake of brevity, "goods/services" will be used herein to refer to the provisioning of any one or more of goods, services and service providers as appropriate for a given context. More specifically and as an example, when a customer makes an appointment (prior arrangement) for a specific cosmetologist at a beauty salon, the appointment making typically includes an assumption that a chair and/or other service station will be available, that the required hair coloring or other cosmetological products will be available and, importantly, that the specific service providing cosmetologist will be aware of the presence of the customer and will also be there, ready to provide the requested goods and/or services starting at the appointed time or in a promised or implied time window. High confidence detection of a waiting customer in a waiting area is part of the process. Co-associating the prior arrangements with the on-premise provision of the goods/services is also part of the process.

While one example given here relates to the fast food ordering industry and another to arriving for an appointment with a pre-specified cosmetologist, the present teachings are not to be limited to just these few examples. There are many aspects of day to day living where appointment-makers, order-placers and/or prospective recipients of goods/services expect to have their presence in a designated waiting location properly noted, to have prior arrangements associated with actions at that location honored and to have corresponding goods/services timely provided at a scheduled time or in a scheduled or implied time span. The respective recipients/appointment-makers may experience dissatisfaction and disappointment if: (a) their expectations are not well managed, (b) if queues for different kinds of patrons (e.g., drive-through ones, sit down waited-upon ones) are not well managed and wait times are substantially longer than planned for, (c) if goods/services provisioning resources are not well managed to coincide with expectations and arrival times of recipients; (d) if the requested goods/services are not provided in timely, high quality manner or not at all; and (e) if prior arrangements associated with the establishment are not honored. Further examples where similar kinds of issues typically arise include slow-food restaurants where customers arrive at a front end area for seating by a maître d, or where customers are already seated and waiting for a waiter to show up. Yet other examples include medical or alike service providing venues where patients appear at the entrance of an urgent care center and find there is no health provider present to immediately attend to their needs. Entertainment providing venues may have similar problems where customers pre-order tickets online, show up at the theater and find no one present at the will call window. Yet further examples include item-pick up areas where patrons have made appointments to pick up online pre-ordered goods, timely show up at the agreed to pick up area and then have to wait for unreasonably long wait times because service personnel are unaware of their presence or are unaware of prior arrangements (e.g., discounts, redemption of loyalty points) that need to be honored.

In accordance with the present disclosure, two or more high gain directional antennas are located next to one another (e.g., within a foot of one another) and aimed (more specifically, horizontally oriented divergently in one embodiment while having a same vertical inclination) to cover a fine resolution region of interest (a critical transaction area) so that, in one embodiment, narrow partial portions of reception sensitivity lobes of the antennas overlap to thereby define the region of interest. (Note: it is believed that the overlapping of narrow fringe portions of the antenna sensitivity lobes may be responsible for the fine resolution detection and isolation observed with this system. However, applicants do not want to be bound by this belief. It works irrespective of the underlying theory.) In one embodiment, substantially cotemporaneous signal strength indications (e.g., RSSI's) are obtained from respective radio receivers (or from a samples providing one radio receiver) to which the antennas respectively connect. A relative signal strength difference factor ($|\Delta RSSI|$) is generated from the simultaneously or otherwise substantially contemporaneously received (e.g., sampled) signals of the co-located directional antennas. A running over-time average factor is also generated from the relative signal strengths of the simultaneously or otherwise substantially contemporaneously received signals. (As used herein, the term "substantially contemporaneously" covers simultaneously received radio signals and also those received at substantially the same time so as to allow for pinpointing where a currently stopped or slowly moving target emitter is located. The slowness of movement and degree of resolution for pinpointing will vary according to context.) A normalized signal strength value is derived using a ratio that includes on one side thereof (e.g., the numerator side) an absolute value of the difference factor ($|\Delta RSSI|$) and on the other side thereof (e.g., the denominator side) includes the running average value (Avg(Rss1+Rss2+ ... )). Thus, the absolute measure units of the receiver generated signal strength indications (RSSI's) substantially cancel out and a normalized signal strength value (NRss) is obtained. This normalized signal strength value (NRss) can be used for further data processing without having to account in the software for specific characteristics of the directional antennas and their respective radio receivers. In one embodiment, the relative signal strength difference and average values are obtained using the IEEE 802.11 RSSI (Relative Signal Strength Indication) data broadcast by protocol compliant wireless devices. In an alternate embodiment, the IEEE 802.11 RCPI (Received Channel Power Indicator) data is used. A somewhat generalized version of the normalized signal strength value may have the form:

$$NRss = 100 - \frac{|Rss1 - Rss2|}{\text{Avg}(Rss1 + Rss2)} \qquad \text{Eq. (1)}$$

where for this example the 100 value is an arbitrarily picked maximum amount, where sampling for the Rss1 and Rss2 amounts is empirically determined based on the RSSI reporting frequencies of the utilized radio receivers (or samples-providing one receiver) and where the chronological window size for the running average factor is also empirically determined. It is within the contemplation of the present teachings to alternatively or additionally use an inverted ratio where the difference factor ($|\Delta RSSI|$) is in the denominator and the running average value (Avg(Rss1+Rss2+ ... )) is in the numerator. When more than two directional antennas are used, the running average may be that of three or more of the respective receivers (or corresponding samples) while separate difference factors are generated pairwise for different permutations of the antennas. It is also within the contemplation of the present teachings to include various, empirically determined weighting factors and/or nonlinear functions for generating the normalized signal strength value (NRss) and the running average value (e.g., Avg(W1*Rss1+W2*Rss2+ . . . )). The weighting factors may include antenna-favoring factors as disclosed later below.

When a PAS transmitter is located at the center of the fine resolution region of interest and equation Eq. 1 is used as the confidence level generating algorithm, the difference value (ΔRSS) will be at or near zero and the NRss factor will be at its maximum (e.g., NRss=100 in the case of exemplary equation Eq. 1). Also, when the average value (Avg(Rss1+Rss2+ . . . )) is relatively high, meaning the signal of the targeted PAS emitter is not attenuated; the NRss factor will approach its maximum (e.g., NRss=100), When the PAS transmitter is located at one or the other of the ingress or egress sides of the fine resolution region and equation Eq. 1 is used as the confidence level generating algorithm, the absolute difference value (|ΔRSS|) will typically be at its maximum, the average value (Avg(Rss1+Rss2+ . . . )) will be relatively low and the NRss factor will be at a relative minimum. The NRss factor may thus be used as a normalized measure of confidence that a PAS transmitter is located in or centered within the fine resolution region. Or alternatively, it may indicate that a PAS transmitter is not located inside the fine resolution region In one embodiment the fine resolution region of interest has length and width dimensions on the order of two by one meter or less.

It is to be understood that above equation Eq. 1 is merely an example for showing how a normalized confidence factor can be generated. It is not necessary for the confidence factor to be normalized or for the antennas to be equally favored. A non-normalized confidence factor can be instead generated and used in accordance with the following equation Eq. 2:

$$nNRss = A - B*|D*Rss1 - (1-D)*Rss2| + \frac{C}{\text{Avg}(Rss1 + Rss2)} \qquad \text{Eq. (2)}$$

where A, B and C are empirically picked constants (C is a negative value) and D is a left versus right favoring factor in the range 0 to 1. When D=0.5, the reception strength values obtained from the corresponding antennas are equally favored. The D favoring factor can be programmatically varied to pick the portion of the antennas-covered region (e.g., the center portion) where weighted strengths substantially equalize. Thus, even if the co-located antennas are fixedly mounted, the spot in the region of interest where the received and weighted signal strengths are to substantially match, and thus provide the maximum confidence level, can be programmatically shifted. Although normalization does not occur in equation Eq. 2, the non-normalized confidence factor (nNRss) increases as the favoritism-weighted difference value (ΔRSS) approaches zero and/or as the average strength value (Avg(Rss1+Rss2+ . . . )) increases. Conversely, the non-normalized confidence factor (nNRss) decreases as the favoritism-weighted difference value (ΔRSS) increases above zero and/or as the average strength value (Avg(Rss1+Rss2+ . . . )) decreases. The average strength value may also be generated using favoritism-weighted strength determinations (e.g., Avg(W1*Rss1+W2*Rss2+ . . . )). Appropriate threshold values can be picked empirically for determining if the non-normalized confidence factor (nNRss) provides a sufficient confidence level for respective contexts (e.g., times of day, level of background noise) for concluding that the PAS emitter is in or outside of the region of interest. In one embodiment, when the confidence factor is above a predetermined threshold level, a confidence-based action is taken, for example associating a unique identification provided within the PA-signal with a placed order for goods and/or services while the detected PAS emitter is inside the fine resolution region of interest. In one embodiment, thresholds and weighting factors are determined based on over-time machined learned optimizations and historical data stored in a database.

Yet more generally, the generating of the confidence signal may take on the form of the following equation Eq. 3:

$$nNRss = A - B*|D*Rss1 - (1-D)*Rss2|^E - \frac{F}{(\text{Avg}(W1*Rss1 + W2*Rss2)^G} - H*\frac{|Rss1 - Rss2|}{\text{Avg}(Rss1 + Rss2)} \qquad \text{Eq. (3)}$$

where A, B, E, F, G, H, W1, W2 are empirically picked constants and D is a left versus right favoring factor in the range 0 to 1. Power factor E is preferably greater than 1 to thereby accentuate the difference factor. Power factor G is also preferably greater than 1 to thereby accentuate the running average strength factor.

It should be noted here that the locating of users of personal mobile devices is known for relatively coarse levels of resolution. For example, cellular towers may be used to determine presence of cellular smartphones within respective telephone communication cells or as the users cross from one cell to the next (and invoke cellular handovers) or by means of proximity triangulation. In another example, the users' mobile devices use GPS satellite technology (a form of multilateration) to determine respective locations to a resolution of a few meters (e.g., 10's of meters) and to then broadcast this location information. However, for finer levels of resolution based on short range broadcasts, supporting technologies are limited. In particular, if a PA-signal is relatively weak because the PAS transmitter is disposed within a broadcast attenuating environment such as the inside of a metallic vehicle, it becomes difficult to distinguish that PA-signal from competing background noise or interference by other nearby radio transmitters (including other PAS emitters). It has been found that the use of the plural co-located directional antennas with partly overlapping and relatively narrow reception sensitivity lobes (e.g., primary forward lobes) in combination with determination of when the received signal strengths for the favoritism-weighted plural antennas null out (ΔRSS=0) works well for determining presence within the narrow region of overlap, with a relatively high level of confidence, of a specific attenuated PAS emitter even in the presence of background radio noise and/or competing nearby other transmitters.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the present teachings. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

FIG. 1 illustrates an environment (e.g., a fast food retail venue) 100 which can support a number of different online and in-person ordering schemes in accordance with the present disclosure. The schematic illustration depicts the venue 100 as having venue-controlled or venue-monitorable areas such as a vehicle drive-through interface area 110, a pedestrian interface area 120, a product processing area 130, a logistics processing area 131, a vehicle parking area 140 and other customer-traversed areas 150 (e.g., a storefront sidewalk area, a building lobby, an elevator waiting area, an elevator car, a staircase, an escalator, a hallway leading to the venue and so on). For some of relatively small regions among these areas, it can be important for business operations to detect with a high degree of isolation and confidence the presence of a single PAS transmitter in that relatively small region (narrow width region of interest) while not simultaneously recognizing radio signals from nearby other transmitters that are outside the relatively small region (also referred to herein as the fine resolution region of interest). An example of such a region of interest is that adjacent to the verbal order receiving microphone or speaker of a fast food drive through area. Another example of such a region of interest is that adjacent to the order pickup window of a fast food drive through area. Particularly when customers are tightly queued one immediately next to the other it is important that taking of orders and corresponding handing out of ordered goods should not be mixed up when using the PAS emitters of customers as a means for associating the orders with the respective customers.

Additionally, prior arrangements that were made by/for the customer/recipient and are applicable at the critical location should be honored when the customer/recipient engages with the establishment at the critical location. Examples of prior arrangements include, but are not limited to: (1) acquiring rights to discounts by way of online or off-line acquisition of valid coupons; (2) acquiring rights to discounts by way of pre-accumulated loyalty points that are now redeemable; (3) acquiring rights to discounts and/or other special treatment by way of having membership in certain organizations; (4) acquiring rights to enhanced product size or quality or added products/services without price increase due to acquired coupons and/or memberships; (5) acquiring rights to addition of more loyalty points to the customer's account; (6) acquiring rights to specially-sped up delivery of goods/services; (7) acquiring rights to enhanced products/service due to a winning engagement in an online game of chance (e.g., a scratch and match lottery); (8) modifying an order that was previously recorded (e.g., adding more to it or increasing size or quality); (9) having a previously made payment (e.g., to the store or to a customer account) automatically debited for fully or partially paying for a current at-location transaction; (10) causing a previously made order placed by/for the specific person at the critical location to be honored at the critical location based on identification of that specific person being currently present at the critical location; (11) causing a previously recorded identification (e.g., name) of the specific person whose PAS emitter is detected at the critical location to be used at the critical location when greeting or otherwise communicating with that specific person at the critical location; (12) using the prior arrangements to facilitate payment and/or other transactions conducted at the critical location.

The above are merely nonlimiting examples of goods/services providing spots that may be found in a patrons-servicing establishment and modifications that may be automatically applied to transactions when the customer/recipient performs a transaction at a critical on-premise location. More specifically, the illustrated establishment 100 may include an interior sitting area 122 (e.g., a waiting area with furniture such as metallic tables and/or metallic chairs) where patrons 123 who have pre-ordered online or at a verbal order taking station while using worn (or carried) location-revealing mobile devices 125 (e.g., from different manufacturers) may wait for the requested items to be delivered to them (to their specific seat) by a service provider (e.g., waiter) or to be notified that the requested items are available at a pick-up window. The establishment may include interior queue lines 121 where other patrons 124 who have pre-ordered online (and who optionally carry or wear location-revealing mobile devices 125'; e.g., sometimes inside a handbag filled with metal objects that attenuate radio signals) or who plan to verbally order at the counter, can line up for more immediate service at a service counter where; when they reach the counter, they expect to immediately receive their preordered items (e.g., fresh hot food items, cold drinks) or have their verbal order immediately taken at that spot. The establishment may include one or more self-service kiosks 126 at which the customer can manually record and/or edit order choices (e.g., menu items listed on a touch sensitive screen), place the recorded order and optionally pay for it (e.g., with a credit card). The establishment may yet further include one or more drive-through servicing stations and/or windows 112 (optionally of different kinds, including those with order receiving microphones or speakers) to which driving-through vehicles 114 approach in order to verbally and/or otherwise manually place orders or immediately receive delivery of their online or otherwise pre-ordered (and optionally pre-paid for) items. The driving-through vehicles 114 and/or their drivers may possess location-revealing mobile devices such as smart phones 115, smart watches and so on used for associating the orders with unique identifications broadcast by their location-revealing mobile devices and for thus also associating the orders with the respective customers (and for optionally pre-paying for the goods/services) and for tracking the locations of the location-revealing mobile devices so that the ordered goods/services can be correctly provided to the associated customers without mix up.

In one embodiment, the establishment 100 includes or has access to coarse, medium and fine resolution location determining scanners (e.g., Bluetooth™ scanners, Fifth generation (5G) Wi-Fi scanners) 127 which cooperatively interact with software installed in the location-revealing mobile devices 125, 125', 115 of the various patrons 123, 124, 114 for determining to varying degrees of resolution, their respective locations in areas (e.g., 110, 120, 140, 150) for which the establishment has tracking rights or permissions where the tracking can be carried out to respective levels of course, medium and finer resolutions (e.g., the finer being to within about a meter or less). Although not shown in FIG. 1, it is to be understood that the fine resolution location determining scanners 127 are operatively coupled (e.g., wirelessly or by way of cables or IR light beams) to a computer network for relaying location determinations made by them for processing by one or more data processors available on the network. The scanners 127 can keep track to appropriate levels of resolution (e.g., to within 6 feet, 3 feet or less, etc.) of where pedestrians are in the pedestrian interface area 120 and where vehicles are in vehicle accommodating areas such as drive-through lane 110 and parking area 140. Although shown in FIG. 1 only by means of schematic dots, it is also to be understood that the medium and fine resolution location determining scanners 127', 127" or equivalents are also provided in the parking area 140 and in other patron-traversed areas (e.g., surrounding sidewalks). It is to be understood that although Bluetooth™ and 5G directed beam Wi-Fi transceivers are mentioned as examples of medium and fine resolution location determining scanners, the present disclosure is not limited to just these examples. Rather, numerous alternative wireless devices can be used for providing fine resolution location determination (e.g., to a resolution of one meter or less, preferably 2 feet or less) including optical (e.g., IR) and magnetic detectors. In particular, in this disclosure, the use of directional antennas with overlapping narrow portions of their reception sensitivity lobes will be discussed together with co-associating prior arrangements made for/by the in-location transactor and/or transaction with the detected presence in the fine resolution region of interest.

There are situations where it becomes desirable to isolate signal reception to a single targeted PAS emitter (e.g., smart phone or smartwatch) in a narrow, fine resolution region of interest while ignoring reception from nearby other radio transmitters even in cases where the PA-signal from the single targeted PAS emitter is attenuated (e.g., due to a low battery condition and/or due to being partly shielded by metallic structures) and/or in cases where the fine resolution region of interest in which the single targeted PAS emitter is situated has a relatively high radio noise content (low SNR). Examples of such situations where isolation to a narrow region of interest is desirable include that of a crowded ordering line where one customer at a time approaches a verbal order-taking speaker or microphone to place his/her order while other customers are queued up in close proximity to the ordering station with their respective PAS emitters also turned on. It can be desirable to make sure that each verbally provided order (or otherwise manually placed order; e.g., via a walk-up kiosk) is logically associated with the single PAS emitter of the one customer closest to the verbal ordering speaker or microphone or kiosk touch screen and is not confused with PAS generators of other nearby customers. This can be true for customers who are lined up in respective automobiles having metallic frames (e.g., 114) or for customers who are approaching a walk-up verbal ordering microphone/speaker/kiosk at the sidewalk. In the case of customers who are lined up in their respective automobiles, the signal strengths generated by their respective PAS transmitters (e.g., 115) can vary based on make or model of the transmitter, based on current battery voltage, based on where within the automobile (or other conductor containing environment) that transmitter is placed (e.g., against the front windshield, in a side door holding area, under the driver's seat, etc.) and how the internal or external antenna of the transmitter is oriented. Because of all the possible variations, a consistent (e.g., normalized) method of determining disposition within the narrow region of interest is desired.

Yet another example of a situation where it is desirable to isolate reception to the PA-signal a single targeted PAS emitter (e.g., smart phone or smartwatch) while ignoring reception from nearby other PAS generators at the order pickup window (e.g., 112). The packaged products which are to be handed over to the customer directly in front of the order pickup window may be logistically tied to the identity of that customer's PAS emitter. Hand over of packaged products to customers may undesirably become mixed up if the PA-signal of another generator is picked up rather than the PA-signal belonging to the customer directly in front of the order pickup window. Thus, a consistent (e.g., normalized) method of determining disposition within the narrow region of interest is desired. These are just examples.

The interior of the goods/services provisioning area 130 (e.g., kitchen) is not shown but may be understood to include various preparation and production stations including those for storing utensils, for assembling utensils (e.g., pots, pans) to be used for a specific order, for collecting raw or finished materials, for processing them (e.g., cooking meats, carbonating, mixing and/or cooling drinks, toasting bread slices, etc.) and packaging them (e.g., on trays or into bags) so that they can be conveniently provided to respective ones of the recipients (e.g., 123, 124, 114) at the appointed times and places, for example at the order pickup window (e.g., 112), based on pre-association with their specific PAS emitters. The interior of the goods/services production area 130 may alternatively or additionally include service providers (e.g., cooks, waiters, dishwashers, table bussers) who are charged with performing various work assignments at specific work stations. These production workers may also need to be available and in ready condition so that timely and high quality provisioning of requested goods/services can occur. In general, it takes time for preparation and production activities in the goods/services provisioning area 130 (or out on the floor) to complete and this preparation and/or production time should be accounted for when confirming (committing to) orders or other online or on-premise requests made by patrons of the establishment and when assuring that the promised goods/services are delivered as promised to the right customer. The establishment may have yet other specific areas, for example a back office logistics-processing area 131 within which specific personnel may be required to be present in very specific (e.g., narrow width) locations during predetermined times. It may be important to determine with a high degree of confidence that the PAS transmitter of one specific worker is present in a very specific region of interest even if there are other workers situated nearby with their own PAS transmitters turned on.

In one embodiment, the parking area 140 may include parking spaces 141a-141n (n being an indicator of number of parking spots) that can be reserved online. Various kinds of sensors including Bluetooth™ ones and/or magnetic proximity ones (127') may be used to sense whether or not a correct vehicle is positioned in respective ones of the reserveable or public spots 141a-141n and who is sitting in (or on) the vehicle (e.g., automobile, motorcycle, bus). The present teachings contemplate a patron (e.g., 123, 124) of an establishment (e.g., 100) making on online reservation for a reserveable parking spot (e.g., 141a-141n, optionally spots of different sizes), getting confirmation that the requested spot is reserved in a particular first time window for the patron and also pre-ordering goods/services and getting confirmation that the requested goods/services will be provided to that specific patron in the same first time window or in a second time window that starts after the start of the first time window. Thus the patron can receive assurances that both a parking spot and the correct requested goods/services will be timely provided.

Although FIG. 1 may be viewed as implying that customer populations and traffic flows in the exemplary establishment 100 are being well managed such that interior queue lines (e.g., 121) are neither too long or too short, such that exterior queue lines (e.g., drive-through lane 110) are neither too long or too short, such that goods/services preparation and production area (e.g., kitchen 130) is neither overwhelmed with too many orders nor underwhelmed with too few, and such that food items are provided in prime condition (e.g., hot and fresh) to the appropriate customers such outcomes do not come about inherently. If the establishment 100 accepts (commits to) too many online orders at once, the waiting areas may quickly fill with crowded together and upset customers. If the establishment 100 accepts (commits to) online orders made by prospective recipients who are far away (distance-wise or timewise) but prepares the food items too soon, the items will be cold and stale by the time the recipients arrive. If the establishment 100 accepts (commits to) online orders made by prospective recipients who are very close (distance-wise or timewise) and then tries to rush the food preparation to coincide with too-early arrival times by those nearby recipients when the kitchen is trying to fulfill the orders of customers who are already waiting, food quality may suffer and customer good will may be lost. On the other hand, if commitments to provide are made based on automatically repeated monitoring of recipient locations (e.g., to high degree of resolution for certain critical spots) and based on automatically repeated monitoring of capabilities to prepare and produce requested goods/services in timely and high quality fashion, many of these problems can be avoided or at least minimized. It is to be understood by the way that the establishment 100 (e.g., fast food venue) is not limited to fulfilling only online made requests for goods/services. Commitments (verbal or otherwise) may be made to other kinds of patrons including walk-ins. Some of the technology disclosed herein may be used to detect the presence of patrons other than those who make online requests for goods/services. The capacity of various physical wait areas and virtual wait-lists to timely accommodate online requests for goods/services may take into account detection of the other kinds of patrons and/or may take into account statistically-based predictions (e.g., made by an expert knowledge base) about how many of the other kinds of patrons are to be expected and when. In one embodiment, if the specific establishment (e.g., 100) decides not to commit to the online request for the goods/services, its software (e.g., downloaded mobile app 317) may automatically suggest alternate establishments to whom the request can be redirected, for example another branch of the same brand.

Figure 2A:
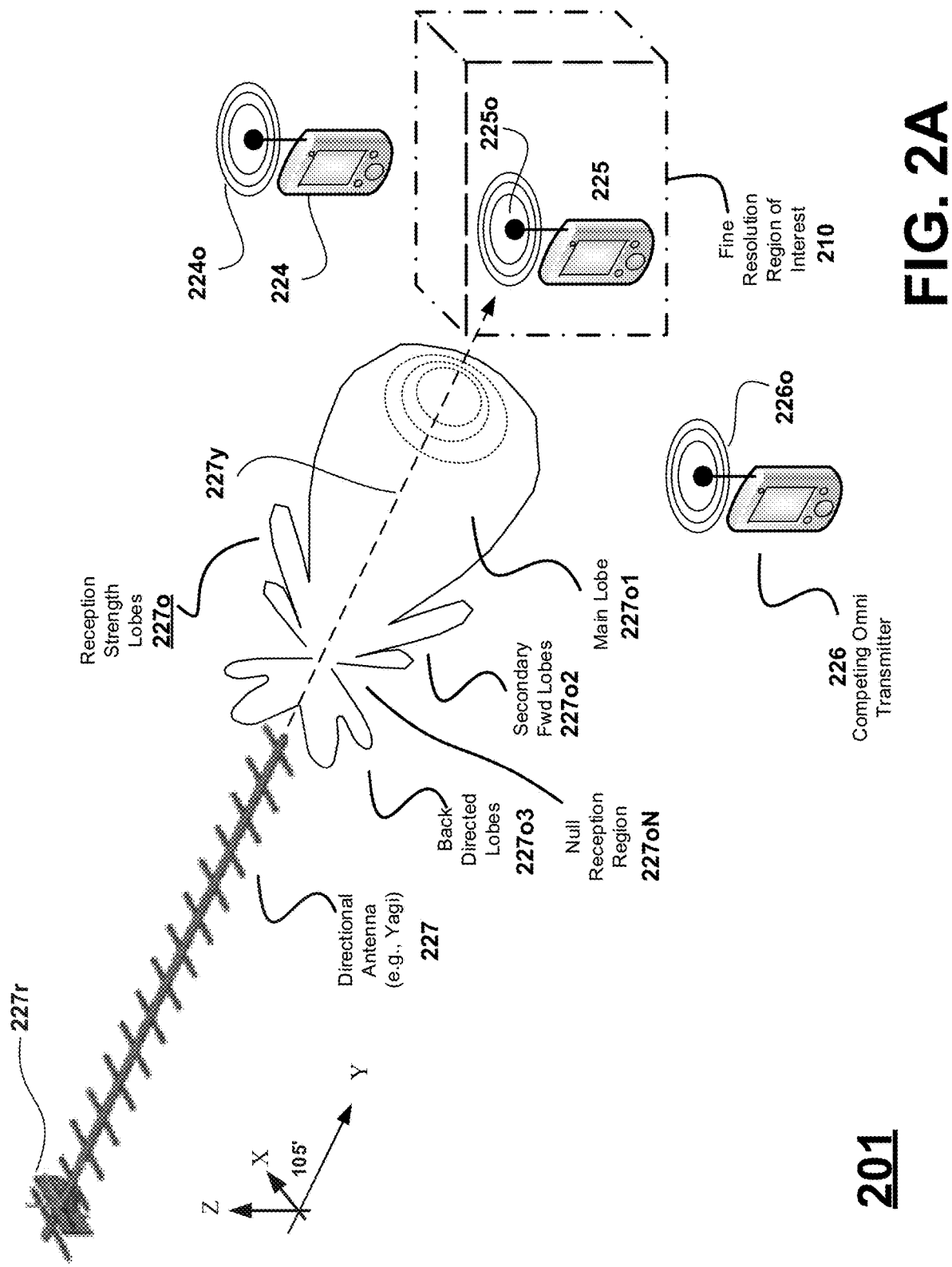
FIG. 2A is a schematic for explaining properties of an exemplary high gain directional antenna and the problem of a desired fine resolution region of interest (isolated detection region) being surrounded by interfering radio transmitters or other sources of noise.

FIG. 2A is a schematic diagram of a first situation 201 in which a high gain directional antenna 227 (e.g., a Yagi antenna in this example) is pointed directly towards (as indicated by longitudinal pointing axis 227y) a fine resolution region of interest 210 in which a single targeted PAS emitter 225 having an omnidirectional transmission output 225o is situated. However, in accordance with the problem recognized by the present disclosure, there may be another omni-directional transmitting PAS emitter 226 (having omnidirectional transmission output 226o) just outside a first side of the region of interest 210 but within the forward sensitivity lobe (227o1, discussed below) of the antenna. The omnidirectional transmission output 226o of the second emitter 226 may overpower that (225o) of the targeted PAS emitter 225. Additionally or alternatively, there may be yet a third omni-directional transmitting PAS emitter 224 (having omnidirectional transmission output 224o) just outside a second side of the region of interest 210. Its omnidirectional transmission output 224o may similarly overpower that (225o) of the targeted PAS emitter 225. The directional antenna 227 (and its associated radio receiver—not shown) may fail—due to the width of its one main lobe 227o1 of reception sensitivity—to pick up the PA-signal 225o of the targeted PAS emitter 225. This may occur because of interference from competing other PAS transmitters (e.g., 224 and 226) or because of general background noise. Although the example given here is of idealistic PAS emitters with omni-directional PA-signal transmission patterns, it is to be understood that the present teaching are not limited to omni-directional PA-signal transmission patterns. The PAS emitters may have other transmission patterns in free space and/or they may be enclosed within a structure (e.g., metallic frame of an automobile) that causes their emissions to be other than omni-directional. In other words, at a given location of reception, their signals may appear to have specific directionality (e.g., due to shielding by radio wave reflecting objects) and/or specific polarization.

FIG. 2A schematically shows a reception sensitivity surface (also referred to as reception strength lobes 227o) of the Yagi antenna 227. The reception sensitivity surface is depicted as being spaced forward (in the Y direction) of where it is actually located for sake of explanatory simplicity. In actuality, a main null reception region 227oN of the exemplary antenna would be positioned where the back reflector plate 227r of the antenna 227 is located. There would be some minor back-directed sensitivity lobes 227o3 behind the reflector plate 227r while the main or primary directional sensitivity lobe 227o1 extends forward of the reflector plate in the direction of the longitudinal axis 227y of the antenna. As further seen, the reception sensitivity surface may includes narrower, secondary forward lobes such as 227o2 separated from the main lobe 227o1 and each other by further null sensitivity regions (also referred to here as non-lobes, not separately identified). While not wishing to be bound by it, in accordance with one theory of operation of the present teachings, it s believed that just a peripheral part of the main forward lobe (e.g., 227o1) of a first directional antenna (e.g., 227a of FIG. 2B) is caused to overlap with just an oppositely disposed peripheral part of the main forward lobe (e.g., 227o1) of a second directional antenna (e.g., 227b of FIG. 2B) so that the null-sensitivity regions (non-lobes) just outside the peripheral parts work to diminish reception from emitters outside of the overlapped area (see briefly FIG. 2F). In other words, the null sensitivity regions surrounding the narrow forward lobes (e.g., 227o1) of the plural directional antenna operate to null out or reduce recognition of competing PAS transmitters such as 224 and 226. Although not shown, in one embodiment, one or more metallic shields or collimators or horns of appropriate sizes and locations are placed in front of the directional antenna for the purpose of blocking, diminishing and/or subdividing the main forward lobe or lobes (e.g., 227o1) of the antenna into even narrower reception sensitivity portions.

Figure 2B:
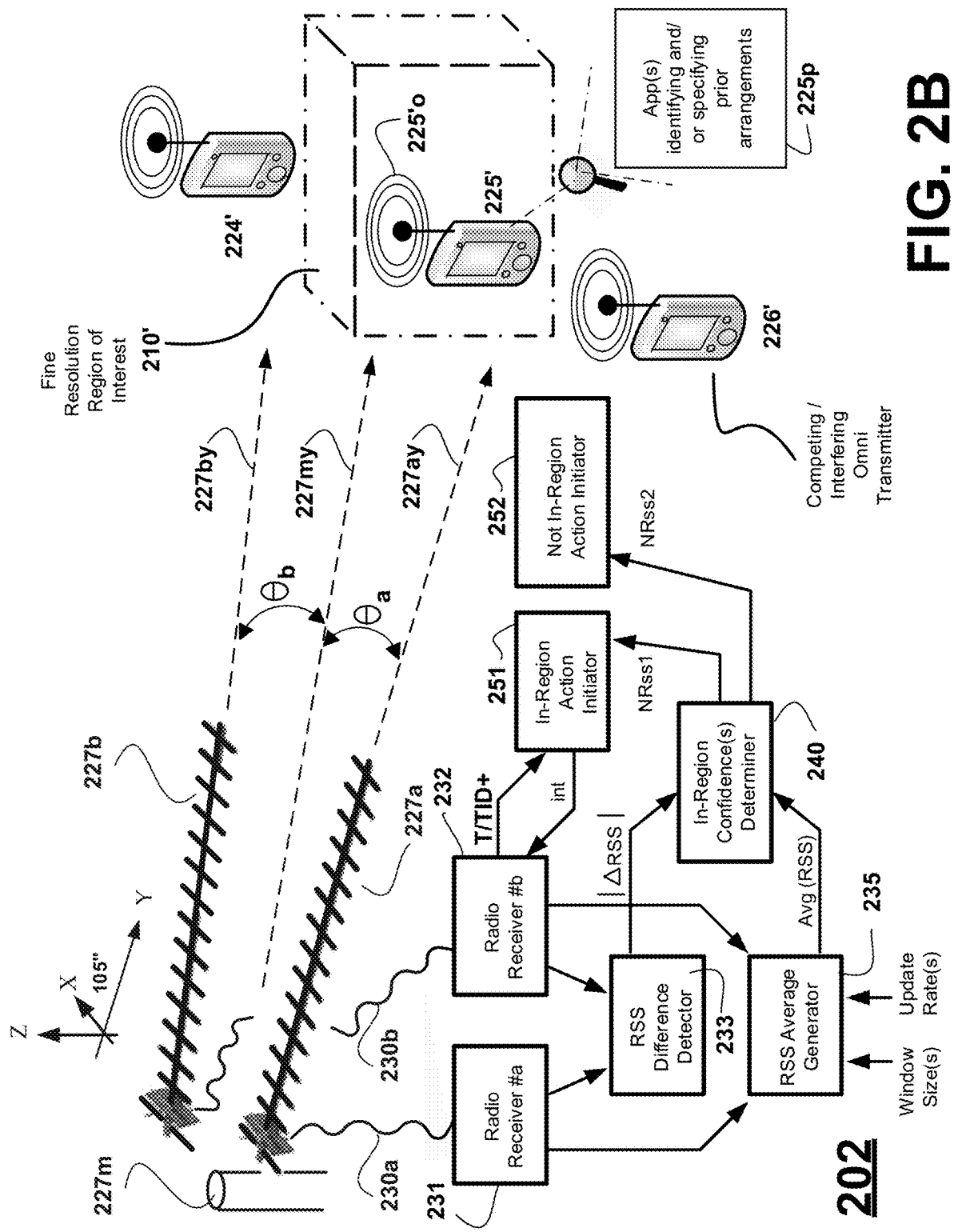
FIG. 2B is a schematic explaining how the fringe reception sensitivity lobes (and null sensitivity non-lobes) of two or more divergent directional antennas may be used to isolation-wise detect presence of a PA-signal broadcasting mobile device within a desired fine resolution region of interest despite being surrounded by interfering radio transmitters or other sources of noise.

Before moving on to FIG. 2B, it is to be appreciated that the present teachings are not limited to the exemplary Yagi antenna 227 depicted in FIG. 2A. The present disclosure contemplates a wide variety of directional antennas of different configurations including those with multiple reflector plates, metallic shields, collimators, horns, differently polarized stubs, various phased array configurations and so on. Each will have its respective reception strength sensitivity surfaces with respective reception lobes and non-reception (nulling) non-lobes. The one illustrated as 227o is merely for sake of example and for explaining the concept of different reception sensitivity lobes and the null sensitivity regions (non-lobes) surrounding them.

FIG. 2B schematically depicts an embodiment 202 in accordance with the present disclosure. In this exemplary embodiment 202, two identical directional antennas (e.g., Yagi antennas) 227a and 227b are co-located at a same height on a mounting pole 227m and close to one another while having essentially same vertical inclinations (e.g., downward toward the ground) and essentially same orientations with respect to signal polarization. However, their respective primary sensitivity axes 227ay and 227by are angled away from a central aiming vector 227my by respective co-planer and equal angles, θa and θb. In one embodiment, each of θa and θb is 45° and thus a total angle of divergence between the two identical directional antennas 227a and 227b is ninety degrees. In one embodiment, the mounting pole 227m is a tall one (e.g., ten feet or higher) the central aiming vector 227my points to the ground (e.g., a vehicle drive through lane extending in the X direction) such that the reception sensitivities of the respective antennas (e.g., 227a and 227b) do not extend to below the ground plane. Thus the region of co-sensitivity is shaped by the ground plane and by the area in which the forward lobes overlap. It is believed that adjustment of the angle of divergence will define the overlap area of main forward lobes (e.g., 227o1 of FIG. 2A) of the antennas so as to thereby define the corresponding fine resolution region of interest 210' while creating regions of null or lowered co-reception sensitivity for competing PAS transmitters such as 224' and 226' disposed nearby but just outside the corresponding fine resolution region of interest 210'. Depending on the specific directional antennas to be used and the location of the region of interest 210' relative to those antennas and the desired dimensions of the region of interest 210', it is believed that each of divergence angles θa and θb can be in the range of about 10 degrees to about 70 degrees, or in a subset of embodiments; in the range of about 30 degrees to about 60 degrees.

It is to be understood that the utilized plural directional antennas do not all have to be identical to one another or all diverging away from one another. There can be more than two such antennas. However, cost and complexity tend to increase as more antennas beyond two, particularly of different kinds, are used. Thus, for sake of cost containment, two antennas are sufficient. On the other hand, if more than two directional antennas are used, the third or yet additional antenna may have a different angle of vertical inclination than the first two, a different angle of horizontal divergence than the first two, and/or a different polarization than the first two. Pairs of such antennas may be used to verify substantial identity of signal polarization as contemporaneously received from the fine resolution region of interest or substantial identity of signal transmission direction or for other such signal reception characteristics.

In the example of FIG. 2B, the RF signal output port 230a of the first directional antenna 227a is operatively coupled to a first radio receiver 231 that demodulates the RF signal. In one embodiment, an RF preamplifier (not shown) may be operatively mounted on the antenna itself. Similarly, the RF signal output port 230b of the second directional antenna 227b is operatively coupled to a second radio receiver 232 and a corresponding RF preamplifier (not shown) may be operatively mounted on the antenna itself. The RF conveying cables (230a, 230b) should be substantially identical and the radio receivers (231, 232) should be substantially identical. Each of the first and second radio receivers, 231 and 232 includes an internal received signal strength measuring module (not shown, but could be one including analog circuitry as well as digital circuitry—see briefly the sampler of FIG. 2C). The included received signal strength measuring module measures an absolute or relative signal strength of the RF signal (e.g., within a predetermined frequency band or range and typically averaged over a short sampling window of 1 second or less) as received from its respective antenna, 227a and 227b. This module outputs a corresponding, relative received signal strength indication (RSSI), typically as digital data and at a corresponding reporting rate corresponding to its signal strength sampling window. In one embodiment, the first and second radio receivers 231 and 232 are identical, located adjacent to one another and output respective relative received signal strength indications Rss1 and Rss2 although not necessarily in synchronism. It is to be appreciated that output RSSI signals from different brands and/or models of radio receivers can vary. They are merely relative indicators used for over-time comparison.

The RSSI data signals of the first and second radio receivers 231 and 232 are supplied to an RSS difference detector 233 which compares them by, for example generating an absolute value difference signal (|ΔRSSI|) obtained from subtracting simultaneously received or substantially contemporaneously received RSSI signals from the two receivers and then generating an absolute value from the subtraction result. (In an alternate embodiment, the subtraction of signal strength representing signals could be carried out as between analog portions of the internal received signal strength measuring modules of the radio receivers and this analog signal can then be digitized and output for further processing.) The RSSI data signals of the first and second radio receivers 231 and 232 are also supplied to an over-time RSS running average generator 235 which generates a running average for a predetermined and continuously advancing time window using the simultaneously received or substantially contemporaneously received RSSI signals from the two receivers. (In an alternate embodiment, the addition and overtime averaging of the signal strength representing signals could be carried out as among analog portions of the internal received signal strength measuring modules of the radio receivers and this running-average representing analog signal can then be digitized and output for further processing.) The respective update rates for generating the absolute value difference signal (|ΔRSSI|) and for generating the running average signal (Avg(RSS)) are empirically determined. In one embodiment it is on the order of about four to five samples per second (e.g., an update rate of about once every 100 ms, or 200 ms or longer). The running average advancing window for the running average signal (Avg(RSS)) can also be empirically determined. In one embodiment it is about 0.5 second long. More than one such running average signal (Avg(RSS)), each based on a different window size and update rate, may be used.

As mentioned, the measurement units for relative RSSI data are generally undefined and can vary from one brand of radio receiver to another. This makes it difficult to come up with a consistent software algorithm for determining with a consistent level of confidence whether a single targeted PAS emitter (e.g., 225' of FIG. 2B) is in the predefined fine resolution region of interest 210' or not. In accordance with one aspect of the present disclosure, a ratio is computed where the numerator of the ratio contains a current one of the absolute value difference signals (|ΔRSSI|) and the denominator of the ratio contains a current one of the running average signals (Avg(RSS)). This creates a normalized value, for example, (|ΔRSSI|)/(Avg(RSS)) where the relative measurement units of the respective radio receivers cancel out and thus a normalized confidence-representing signal is developed. Additionally or alternatively, a reciprocal normalized confidence signal can be created using the inverse ratio, in other words, (Avg(RSS))/(|ΔRSSI|). One or both of these ratios can be used to generate a normalized confidence indicating signal that indicates a degree of confidence as to the single targeted PAS emitter (e.g., 225') being at the center of the predefined fine resolution region of interest 210' or slightly spaced apart from the center (e.g., as programmatically determined by a favoritism weighting factor). In one embodiment, favoritism weighting factors D and (1−D) are respectively applied to the Rss1 and Rss2 values where D is in the range 0 to 1 so as to thereby change the location where D*Rss1−(1−D)*Rss2 goes to zero. In an embodiment where D=0.5, the absolute value difference signal (|ΔRSS|) goes to zero when the omnidirectional radio output 225'o is centered on the central aiming vector 227my of the directional antennas (e.g., 227a and 227b).

As mentioned above, one example form for a confidence factor generating unit such as 240 of FIG. 2B appears as follows:

$$NRss = 100 - \frac{|Rss1 - Rss2|}{\text{Avg}(Rss1 + Rss2)} \quad \text{Eq. (1')}$$

where the 100 value is an arbitrarily picked maximum amount, where sampling for the Rss1 and Rss2 amounts is empirically determined based on the RSSI reporting rates of the utilized radio receivers and where the chronological window size for the running average factor is also empirically determined. In one embodiment, the running average window is 0.5 second long. It is within the contemplation of the present teachings to alternatively or additionally include the inverted ratio within the calculation of the NRss normalized confidence factor. A nonlinear saturating function may be used to prevent the inverted ratio, (Avg(Rss1+Rss2+ . . . ))/(|ΔRSS|) from going to infinity. Various weighting factors and additive or subtractive constants may be empirically determined and used for application to individual terms or combinations thereof in the generating of the normalized confidence factor, NRss. When more than two directional antennas are used, the running average may be that of three or more of the respective receivers while separate difference factors are generated pairwise for different permutations of the antennas. More than one confidence factor (e.g., NRss1, NRss2) may generated at a time while using different computations for each (e.g., differently sized running average windows).

The one or more normalized confidence factors (e.g., NRss1, NRss2) are supplied to respective action initiators 251 and 252. Each action initiators (e.g., 251, 252) may use a respective threshold and timing algorithm for determining whether or not and when to take its respective action. Examples actions to be taken might include: IF NRss1>25 THEN signal order-taker that a customer is at the order placing window and logically associate the isolated PA-signal with the about to be taken order. Another example action might be, IF NRss2<20 THEN signal the order-taker that no customer is presently at the order placing window. In other words, specific actions or inactions may be caused to occur based on the determined confidence factor (NRssM, M being an integer here) that a single PAS emitter is present within a narrow region of interest (e.g., 210').

In the embodiment 202 of FIG. 2B the targeted PAS emitter 225' has installed therein one or more executing or executable (awaken-able) applications, programs or services 225p that will identify a locally unique and current transactor/transaction identification (T/TID) and/or will identify or specify one or more prior arrangements that are to be recognized as part of the actions to be taken by action initiator 251 once the confidence level is determined to be above the current threshold level. In response to the confidence level being sufficient, the action initiator 251 will send an interrogation signal int to the targeted PAS emitter 225'. This can be done via a Bluetooth transmitter (not separately shown) provided in conjunction with the receivers (231, 232) or by way of other transmission paths. In response to the interrogation signal int, one or more of the apps/services 225p will send back (optionally after being awakened by the int signal) the current T/TID and optionally additional information (the plus after the T/TID) that is useful for identifying or specifying one or more prior arrangements that are to be recognized as part of the actions to be taken by the action initiator 251 on behalf of the transactor and/or associated transaction while the targeted PAS emitter 225' is in the narrow region of interest (e.g., 210'). More specifically, if the region of interest is immediately adjacent to a manual order receiving station (e.g., a walk up self-serve kiosk or a verbal order receiving microphone or speaker) and the customer/recipient has a price discount coupon in or logically associated with the targeted PAS emitter 225', that price discount coupon will be automatically honored at the time of calculating the price for the order placed at the manual order receiving station (not shown in FIG. 2B, see briefly 126 of FIG. 1). The customer/recipient will not have to remember that he/she has the coupon and will not have to read out the coupon number. Instead the system, in one embodiment, will automatically indicate (e.g., verbally and/or by way of an interface screen) something to the effect of, "Oh we see that you have a valid discount coupon. The discount is being applied to your order".

There are many different ways that a price discount coupon can become cross-associated with the targeted PAS emitter 225'. In one scenario, the customer has a customer account pre-established with the vendor. The customer finds the coupon offer while browsing online. The customer activates a link that causes the found coupon to be added to his/her customer account. An in-cloud server responsively adds the coupon to the account and issues a T/TID associated with that addition that is automatically loaded into the targeted PAS emitter 225'. Then, when the customer later makes a manual transaction at an order receiving station (e.g., a walk up self-serve kiosk or a verbal order receiving microphone or speaker) and the PAS emitter 225' is detected, the emitter returns the T/TID+ information via Bluetooth or another suitable pathway (e.g., Wi-Fi). The returned T/TID is transmitted to the in-cloud server which responsively looks up all prior arrangements associated with that T/TID. In the example, it would be just the one price discount coupon found online.

As an extension of the above example, later but before arriving at the vendor premises, the same customer finds a newspaper advertisement (e.g., a hardcopy, off-line newspaper) saying, Buy one ProductX and get the second at half price. The newspaper advertisement has special code that the customer is advised to type into a vendor app running on his/her smartphone 225'. When the customer does so, his/her smartphone automatically connects with the in-cloud server and that server responsively adds the Buy one offer to the account and issues a new T/TID associated with that addition as well as with the previously acquired price discount coupon. The new T/TID is automatically loaded into the targeted PAS emitter 225'. Alternatively, the Buy one offer is not reported to the in-cloud server and instead one of the running or re-awakenable apps/services 225p in the emitter stores the information. Then later, when the customer makes a manual transaction at an order receiving station and the PAS emitter 225' is detected, the emitter returns the T/TID+ information via Bluetooth or another suitable pathway (e.g., Wi-Fi) where the "+" portion of the information may include the offline Buy one offer that was stored in the customer's smartphone 225' but not reported to the in-cloud server. In that case the int interrogation causes the system (202) to automatically learn both about the discount coupon and the Buy one get the other at 50% off offer. In one embodiment, the system automatically indicates (e.g., verbally and/or by way of an interface screen) something to the effect of, "Oh we see that you have both a valid Buy one get the other at 50% off offer and a valid discount coupon. Would you like to take advantage of the Buy one offer? The discount will be applied to your entire order". In this second case the customer did not have to remember about either the Buy one offer or the discount coupon. The system automatically keeps track of all prior arrangements the customer made with respect to the given vendor (e.g., fast food establishment) and automatically reminds the customer of their availabilities and also automatically applies the applicable order modifications. Thus the customer's expectations are not only met (if the customer remembered about the prior arrangements) but often exceeded if the customer forgot. This operates to increase customer loyalty and goodwill toward the vendor. It is to be understood that the discount coupon and Buy one get the other at 50% off prior arrangements are nonlimiting examples. Similar actions can be automatically taken with respect to customer loyalty points and other such arrangements, a few of which are mentioned here. More specifically, in one embodiment the customer has pre-registered into a customer loyalty program as a form of making a prior arrangement. When the customer conducts a transaction at a predetermined critical location (e.g., at an on-premises kiosk or another form of manual order taking spot), the loyalty membership points are automatically complied with by the establishment data processing system without the customer's active participation being involved. New points may be added based on the latest placed order(s), discounts may be applied in light of previously acquired loyalty points and so on. In one embodiment, mere presence of the customer at the predetermined critical location, even if the customer does not purchase anything may qualify the customer for additional loyalty points, for example after the customer has stayed long enough to watch a predetermined advertisement or other projected messaging campaign.

Figure 2C:
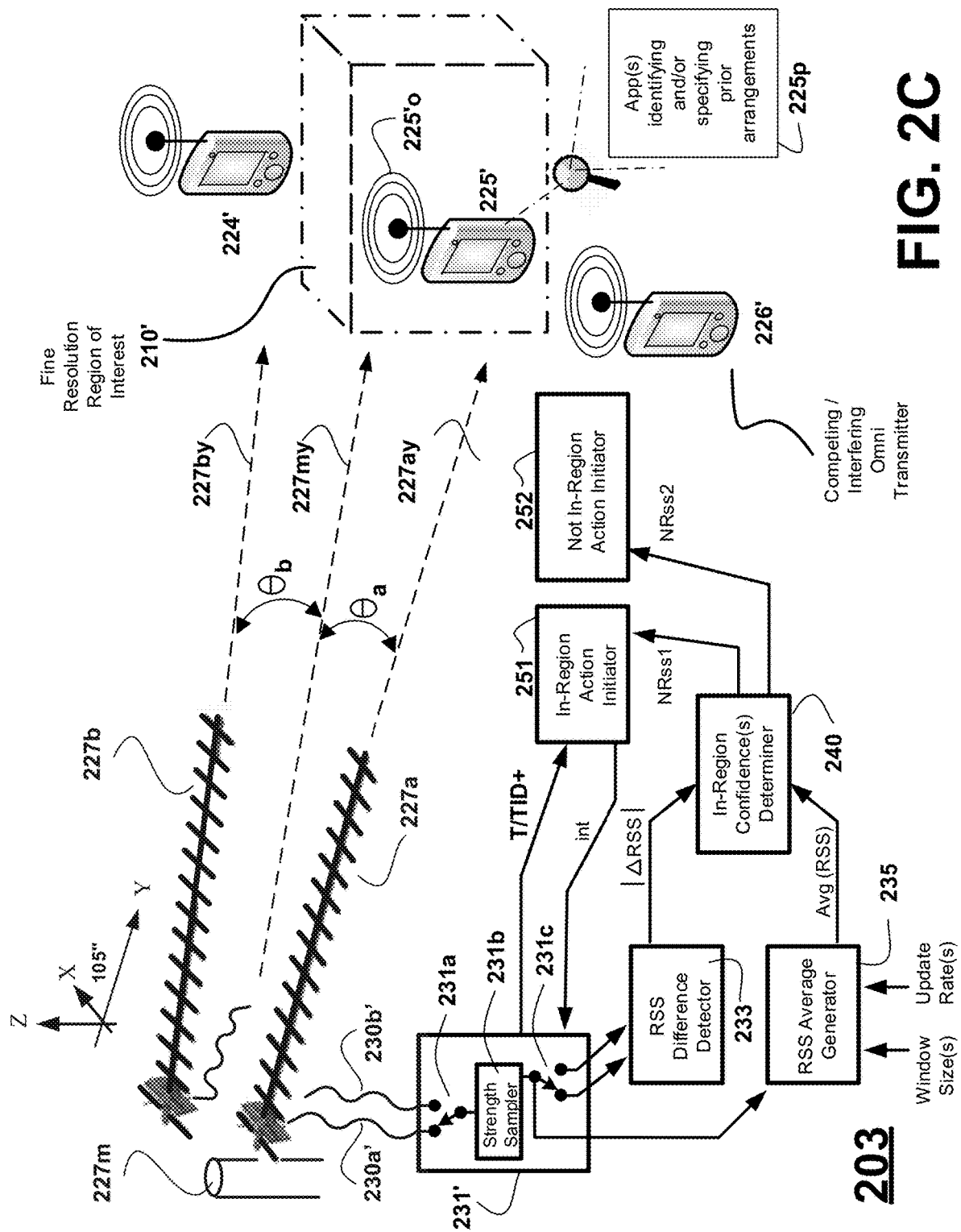
FIG. 2C is a schematic of a variation of FIG. 2B where a single radio receiver with switching action is used.

FIG. 2C (embodiment 203) schematically illustrates a variation in which a switched radio receiver 231' samples respective ones of plural directional antennas (there could be more than two), makes strength measurements (with strength sampler 231b), stores the strength measurements and then reports the respective strength measurements to Rss difference generator 233 and Rss running-average generator 235. An input switch 231a samples the signals (e.g., 230a', 230b') obtained from respective ones of the directional antennas (there could be more than two) and relays the samples to the strength sampler 231b. In one embodiment, the strength measurements are just for those of received PA-signals within a predetermined frequency range that contain a same emitter identification (e.g., HAC field). The strength sampler 231b digitizes its measurements and stores the digital information in a local memory (not shown). The local memory is accessed by a second switch 231c (or equivalent data processor—not shown). The accessed strength measurement data samples are then forwarded at appropriate times to the Rss difference generator 233 for generating pair-wise difference values (optionally with favoritism weights). As noted, there could be more than two antennas (not necessarily all identical ones). The Rss running-average generator 235 may use all the samples produced for a current over-time averaging window or only those for a select subset of the plural antennas. In one embodiment, an artificial intelligence algorithm (AI, e.g., a trained neural network) learns over time as to which combinations or permutations of Rss difference values and Rss running-average values work best with which of permutations of confidence level generating algorithms (e.g., Eq. 2) in which of possible contexts (e.g., time of day, concentration of customers) based on historical data stored in an associated database (not shown) and adjusts the run time system accordingly. In one variation, the Rss difference values and/or Rss running-average values can be produced in an analog portion of radio receiver 231' and thereafter digitized and stored in the local memory. Those skilled in the art will appreciate from the present disclosure that other variations may be used in accordance with the spirit of the present teachings (e.g., using plural sample generating radio receivers like 231').

Figure 2D:
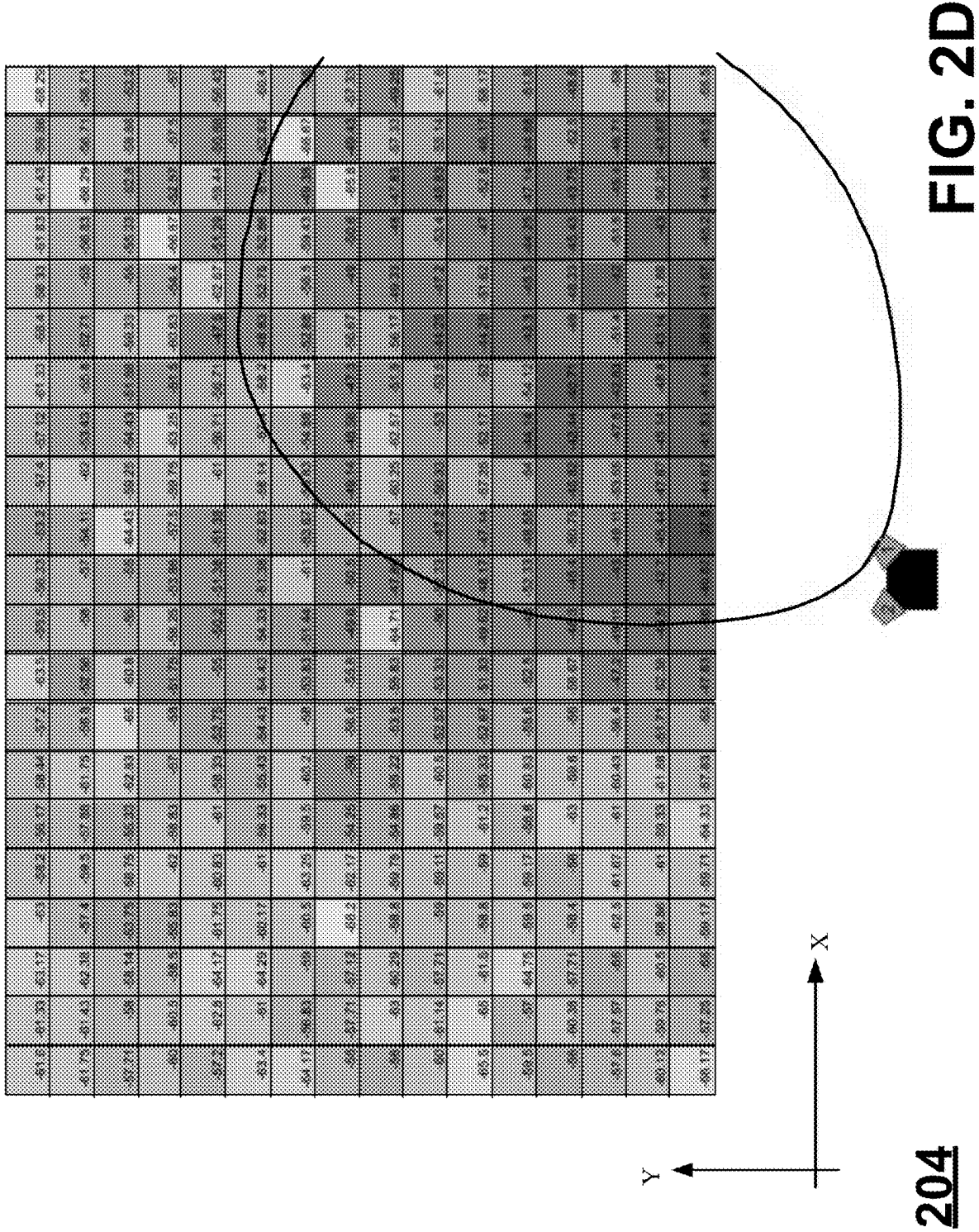
FIG. 2D depicts a reception heat map for a first of two divergent directional antennas as sampled over an XY grid map of a region adjacent to the divergent directional antennas.

FIG. 2D (test example 204) shows the results of a statistical survey taken over a commercial driveway adjacent to downward pointing and identical directional antennas 1 and 2 (each diverging at 45° to the roadway normal, Y axis). The readings in the grid boxes are statistically averaged values of relative signal strength at antenna 1 alone when different emitters (including attenuated ones) were stepped from one grid box to the next while background radio noise was present. The roughly elliptical pattern emanating from antenna 1 is an approximation of the footprint that the main forward lobe of antenna 1 casts on the tested driveway. As seen from the readings in the various grid boxes (ranging from about −40 to about −70, the less negative numbers representing stronger signals and colored as darker grid boxes) there is no clear cut differentiation between cases where the stepped through emitter was inside the cast elliptical pattern or outside for antenna 1.

Figure 2E:
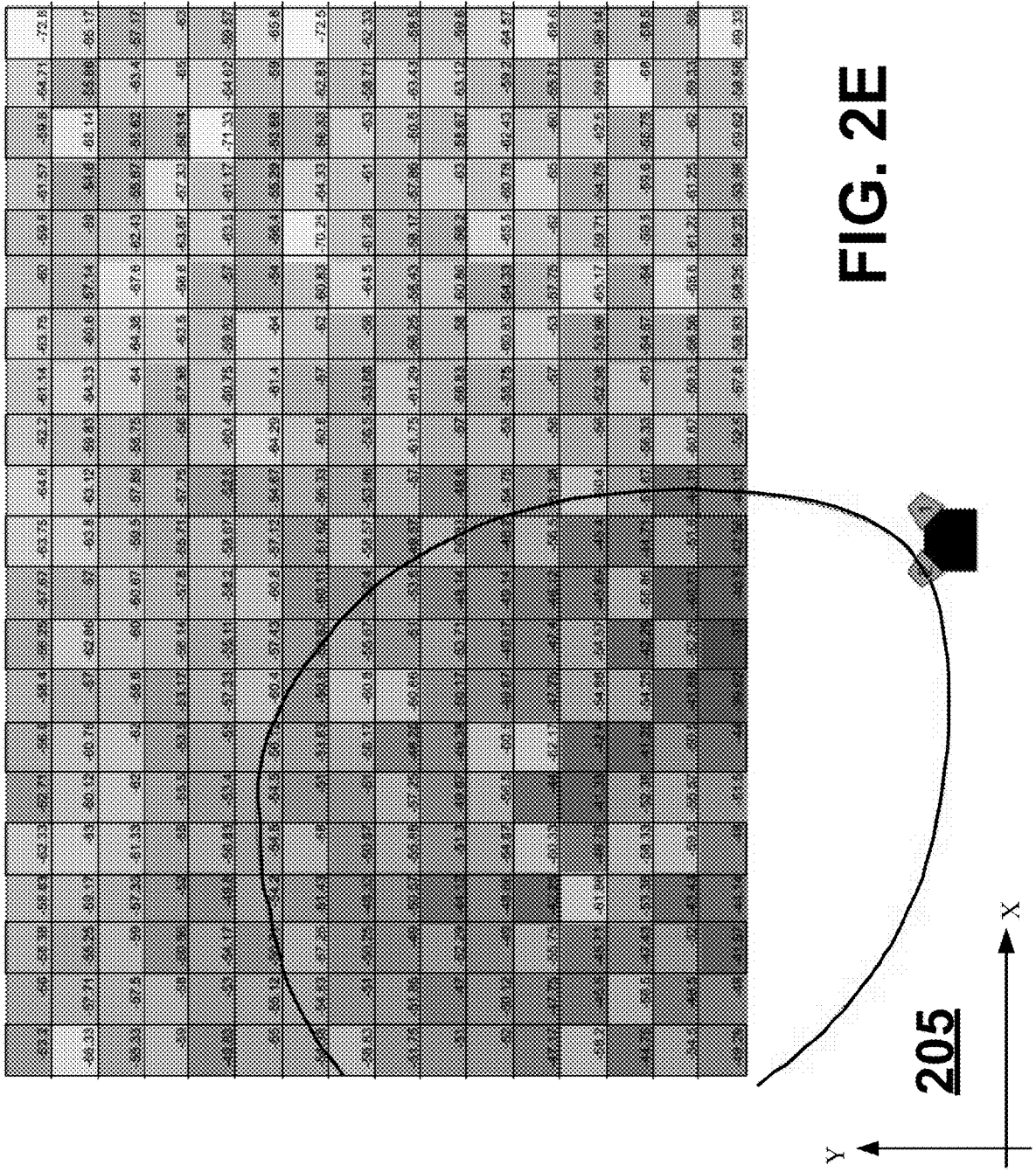
FIG. 2E depicts a reception heat map for a second of the two divergent directional antennas of FIG. 2D as sampled over the XY grid map of the region adjacent to the divergent directional antennas.

FIG. 2E (test example 205) shows the results of a statistical survey taken over the same commercial driveway adjacent to the downward pointing and identical directional antennas 1 and 2 (each diverging at 45° to the roadway normal, Y axis). The readings in the grid boxes are statistically averaged values of relative signal strength at antenna 2 alone when different emitters (including attenuated ones) were stepped from one grid box to the next while background radio noise was present. The roughly elliptical pattern emanating from antenna 2 is an approximation of the footprint that the main forward lobe of antenna 2 casts on the tested driveway. As seen from the readings in the various grid boxes (ranging from about −35 to about −73, the less negative numbers representing stronger signals and colored as darker grid boxes) there is no clear cut differentiation between cases where the stepped through emitter was inside the cast elliptical pattern or outside for antenna 2.

FIG. 2F (test example 206) shows the results of a statistical survey taken over the same commercial driveway adjacent to the downward pointing and identical directional antennas 1 and 2 (each diverging at 45° to the roadway normal, Y axis). The readings in the grid boxes are statistically averaged values of computation results for confidence level. In this particular case the confidence level computation used had the form of equation Eq. 4:

$$\text{Presence Level} = \qquad\qquad\qquad\qquad\text{Eq. (4)}$$
$$\left(1 - \frac{|RSSI_1 - RSSI_2|}{|200 + RSSI_1 + RSSI_2|}\right) \times \left(\frac{100 - 0.5 \times |RSSI_1 + RSSI_2|}{100}\right)^2$$

As seen in FIG. 2F, and indicated by the narrow elliptical pattern touching both of antennas 1 and 2, this time there is a clear differentiation between cases where the stepping through target emitter was inside the narrow elliptical pattern or outside. A threshold value of 0.25 was used to identify the most darkly colored grid boxes. Results below 0.25 are less darkly colored. Results below 0.15 are generally white. The system was able to automatically determine with a high degree of confidence when the PAS emitter was in a narrow region (no more than about 1 meter wide in the X direction) was directly in front of the central aiming vector of the divergent directional antennas despite the presence of background noise. The system was able to automatically reject instances where the PAS emitter was outside the narrow region of interest despite the presence of background noise.

Figure 3A:
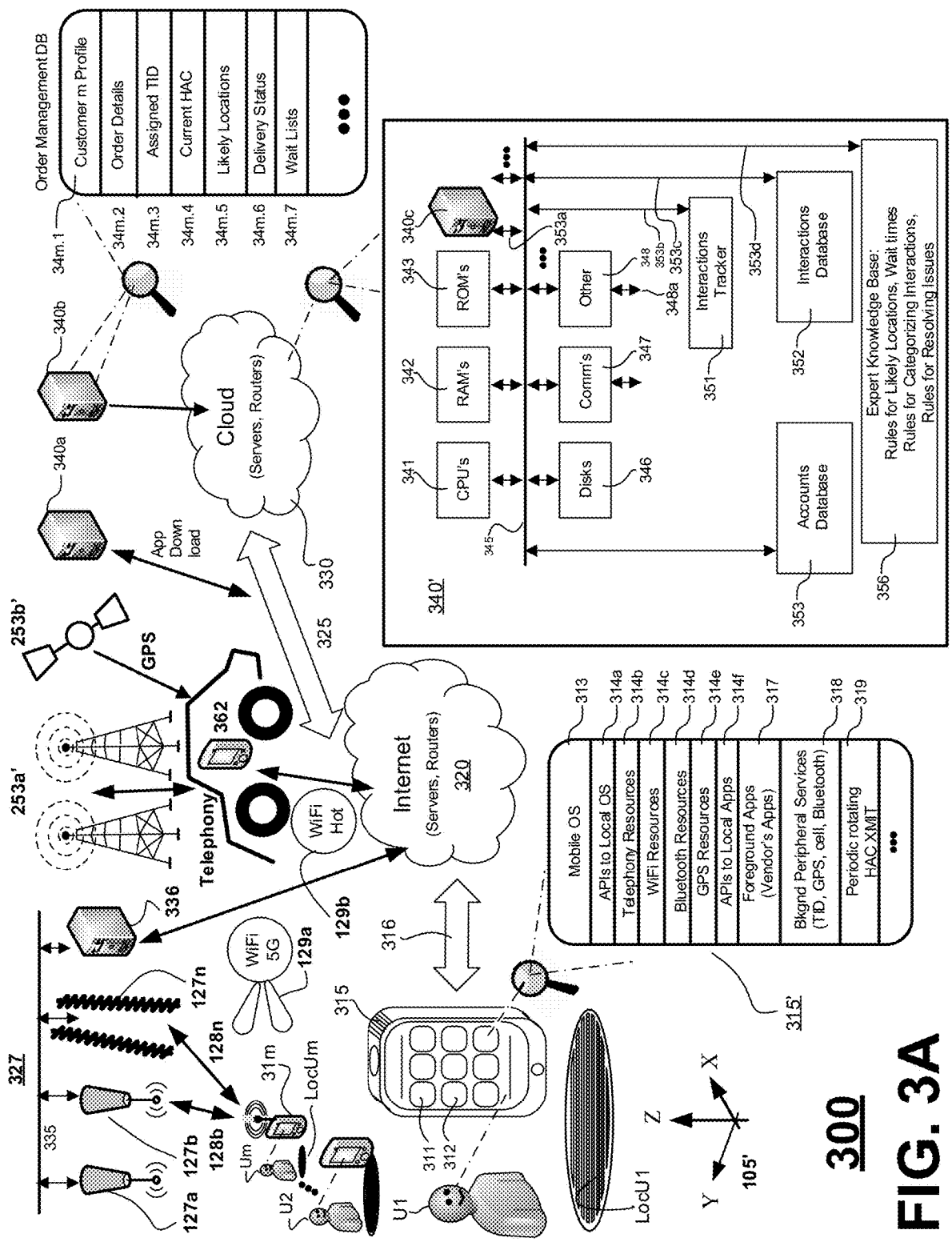
FIG. 3A illustrates a system for determining a location of a mobile user using a personal mobile device carried by the user.

Referring to FIG. 3A, illustrated is a system 300 configured for location sensitive queues and wait-lists management where the system 300 includes portions for automatically determining both coarser and pinpointed respective locations (e.g., LocU1, . . . , LocUm) of respective mobile users (e.g., U1, U2, . . . , Um) using their respective personal mobile devices (e.g., 315, . . . , 31*m*) carried and/or worn by the users as the users traverse various areas including those serviced by cellular telephony base stations (e.g., cell towers 253*a*'—see also 253*a* of FIG. 2), serviced by GPS satellite constellations 253*b*' (see also 253*b* of FIG. 2) and serviced by finer resolution, location determining means (e.g., scanners 327—see also 127, 127', 127" of FIG. 1 and 227*a*-227*b* of FIG. 2B). It is within the contemplation of the disclosure to use various types of scanners such as Wi-Fi ones (e.g., generation 5G ones that provide aimed beams). When a user enters a repeatedly scanned finer resolution area (e.g., 327 corresponding to 127, 127' and 127" of FIG. 1 and 210' of FIG. 2B) that is covered by corresponding scanners 127*a*, 127*b*, . . . , 127*n* (n indicating the number of scanners in area 327) the users' respective locations can be determined to medium and finer degrees of resolution than that possible with just GPS and/or cellular telephony resources.

As indicated in magnified details area 315', the exemplary respective mobile device 315 of exemplary user U1 typically has a predetermined operating system (OS) 313 currently executing within it. Device 315 may have a set of application program-to-OS interfaces (APIs) 314*a* for allowing various further programs 317 within the device 315 to access resources of the OS 313. In one embodiment, the OS allows for OS mediated control over local telephony resources 314*b*, Wi-Fi interface resources 314*c* (e.g., including generation G4 resources), Bluetooth™ resources 314*d*, and GPS resources 314*e*. One of the API accessible resources of the OS is that for establishing one or more background peripheral services (BPSs) 318 that may be dynamically and wirelessly connected to from external devices (e.g., scanners 127*a*-127*n*). The executing OS 313 may on its own periodically test for presence of nearby Bluetooth™ and/or Wi-Fi devices (e.g., scanners 127*a*-127*n*, 5G Wi-Fi routers 129*a*,129*b* and alike other such short range transceivers) and in response to detected presence, occasionally wirelessly broadcast its own Bluetooth™ and/or Wi-Fi presence advertising signal which includes a current hardware accessing code (HAC) of the mobile device 315. In one embodiment, the Bluetooth™ advertising signal has a unique and consistent signature portion that can be used for locating the HAC code as being positioned at a predetermined bit position of fixed bit distance away from a unique signature portion of the PA-signal. The HAC code may extracted based on its predetermined bit position relative to the signature even though the HAC code itself changes on a pseudorandom basis. The schematic of FIG. 3A illustrates the code for occasionally transmitting a rotating HAC as being disposed at section 319 of the personal mobile device. The schematic of FIG. 3A also depicts one or more of established BPSs at area 318. One of the BPSs is one which transmits a Bluetooth™ signal including an associated T/TID (a system-assigned temporary transactor/transaction ID sequence) when that BPS is connected to. Another of the BPSs is one which transmits a Wi-Fi signal revealing the current GPS coordinates of the mobile device 315 as well as identifying the mobile device (e.g., by its currently assigned T/TID). This Wi-Fi signal can be routed out via the internet to a server (e.g., 340*b*) controlled by the establishment. Another of the BPSs is one which transmits a Wi-Fi signal revealing the current cellular telephony coordinates of the mobile device 315 as well as identifying the mobile device (e.g., by its currently assigned T/TID). This Wi-Fi signal can be routed out via the internet to a server (e.g., 340*b*) controlled by the establishment. The establishment controlled server (e.g., 340*b*) may then determine current coarse locations of the mobile device based on the received GPS and/or telephony information and store the results in corresponding database entries (e.g., 34*m*.5).

Various foreground programs that may be used by the user while waiting for provisioning of the requested goods and/or services are depicted as being present in area 317. APIs to the local apps in the mobile device are depicted as being present in area 314*f*. One of the foreground programs that will be running in region 317 in accordance with one embodiment is the vendor's ordering and order progress advisement program. An example of an initial, program launching GUI for the mobile device is depicted at 315 with application invoking icons such as 311 and 312 being present on the displayed graphical user interface. One of the application invoking icons (e.g., 311 or 312) may cause a launching of a vendor's ordering and order/transactions tracking and progress advisement application. This application is stored in area 317 after being downloaded for example from a vendor controlled server 340*a* located in cloud 330 or elsewhere on the Internet 320.

FIG. 3 more broadly depicts an integrated client-server/internet/cloud system 300 (or more generically, an integrated multi-device system 300) within which the here disclosed technology may be implemented. System 300 may be understood as being an automated machine system having distributed intelligent resources including a variety of differently-located data processing and data communication mechanisms including for example, user-carried/worn mobile wireless units (e.g., wireless smartphones 315, . . . , 31*m*) configured to allow end-users thereof (e.g., U1, U2 . . . Um) to request from respective end-user occupied locations (e.g., LocU1) services from differently located enterprise hosts (e.g., on-internet 320 and/or in-cloud servers 340*a*, 340*b*, etc.). In one embodiment, server 340*a* handles the downloading of vendor ordering and order progress advisement apps into mobile devices that request them. The downloading process may include generating unique customer profiles (e.g., including billing information) and customer identifications that are to be used when the respective customers place orders at a later time. In one embodiment server 340*b* handles the managing of placed orders. Server 340*b* may include or connect to an order management database which keeps track for each order-placing user (e.g., user Um, where m is an integer) of: (a) the user's customer profile 34*m*.1, (b) the details of the placed order 34*m*.2; (c) a system-assigned temporary and unique transaction identification sequence (T/TID) 34*m*.3 assigned to the corresponding transaction; (d) a current hardware address (e.g., HAC) being currently used by the customer's personal mobile device (e.g., 31*m*.4); (e) a current one or more coarse and comparatively more pinpointed locations 34*m*.5 of where the recipient is determined to most likely be present at (e.g., in or near the establishment or further away and including those determined to high level of confidence using directional antennas); (f) information about the delivery status 34*m*.6 of the requested goods and/or services and changes added/made based on prior arrangements made for that transaction and/or transactor; and optionally additional information as may be appropriate for the vendor's business model.

It is to be understood that the illustrated configuration of system 300 is merely exemplary. As indicated, it comprises at least a few, but more typically a very large number (e.g., thousands) of end-user devices 315 (only a few shown in the form of wireless smartphones but understood to represent many similarly situated mobile and/or stationary client machines—including the smartphone wireless client kinds, smart watches, and cable-connected desktop kinds). These end-user devices 315 are capable of originating service requests which are ultimately forwarded to service-providing host machines (e.g., in-cloud servers like 340*b*) within a cloud environment 330 or otherwise on-internet or linked-to internet machines (e.g., 340*b*). Results from the service-providing host machines are thereafter typically returned to the end-user devices (315, . . . 31*m*) and displayed or otherwise communicated to the end-users (e.g., U1, U2, . . . , Um, m being an integer). For example, if the business of the vendor is an online, food pre-ordering one, the end-user (U1) may have installed on his/her smartphone (315) a software application ("app" 317) that automatically requests from the order managing server 340*b*, a list of nearest vendor venue locations, the menu of the items that may be ordered online and estimates for when the items will be ready for pick up at a selected one of the venues. In response to the request, enterprise software and hardware modules automatically identify the user, pull up a user profile (e.g., 34*m*.1), store the order details (34*m*.2), assign a temporary and unique transaction identification sequence (T/TID) 34*m*.3 to the corresponding transaction (install it into a corresponding one or more BPSs) and inform the customer of a time range when he or she might arrive at the venue to pick up the order as well a specific location for the pickup (e.g., a drive-through window with directional antenna detection of the user being directly in front of the window). The assigned T/TID may be downloaded into the BPSs of the ordering app at that time order placement or at a later time before it is needed.

When the customer (e.g., Um) arrives at the designated venue and enters an area covered by the location pinpointing scanners (127*a*-127*n*) of the venue, a fine resolution locating process is automatically carried out. Briefly, in one embodiment the presence of the HAC advertising mobile device is detected; an attempt is made to dynamically connect wirelessly to the T/TID-returning BPS of that mobile device; the T/TID is detected by at least one of the location pinpointing scanners (127*a*-127*n*) and the respective strengths of the T/TID-providing signals are measured at respective ones of the scanners including substantially simultaneously at co-located directional antennas. More specifically and merely as an example, if T/TID-returning signal 128*n* has the same relative signal strengths (RSSI's) at divergent directional antennas 128*n* then it may be automatically determined that the corresponding mobile unit 31*m* is located midway between antennas 127*n*. As another example, a set of scanners forming a closed regular polygon and each receiving the T/TID at just above a predetermined signal strength threshold are identified and the personal mobile device is automatically determined to be at the center of formed polygon (e.g., a triangle, rectangle, etc.). The scanners report their respective detections and measurements to a local server 336. The local server 336 then consults with a database or expert rules knowledge base to pinpoint the most likely one or more locations for the targeted customer in view of other factors (e.g., background noise, radio reflections, etc.) that may be currently present at the venue. The pinpointed one or more locations are then relayed to the tracking database, for example into entries region 34*m*.5. The entries region 34*m*.5 may store a history of recent locations and prediction of where the tracked user is most likely to be next located. A human or robotic server for assisting in quick delivery of the requested goods and/or services may then be dispatched to the predicted location of the customer.

In one embodiment, signal coupling from each of the fine resolution scanners (127*a*-127*n*) to the local server 336 is a wireless one such as conducted over a Wi-Fi network. Alternatively, Bluetooth™ signals may be used where one scanner (e.g., 127*a*) relays its detections and measurements to the next adjacent scanner (e.g., 127*b*) and so on until the collected detection and measurement reports are relayed to the local server 336. Signals coupling link 335 represents the various ways in which the respective detections and measurements of the scanners (127*a*-127*n*) are relayed to the local server 336. The signals coupling link 335 may be a wired one and/or may include wired and wireless subportions as opposed to being an all wireless signals coupling link.

In one embodiment, after receiving the respective detections and measurements of the scanners as well as the detected T/TID sequence, the local server 336 connects via the Internet 320 to the order management server 340*b*. The order management server 340*b* uses the relayed T/TID sequence to reference the corresponding customer order details 34*m*.1-34*m*.7 of user Um and his/her corresponding order. The order management server 340*b* may additionally consult with an expert knowledge base 356 (example shown in server 340') to determine, based on the relayed signal measurements of the scanners, what the one or more most likely current locations of the customer are at the respective venue and for the extant conditions there. When the ordered goods and/or services are ready for delivery to or pickup by the customer, the order management server 340*b* reports the latest one or more most likely locations of the establishment. For example the report may be in the form of a sorted list of most to least likely locations. In one embodiment, after pickup or delivery is reported as complete, the corresponding T/TID is erased from the user's mobile device and also from the database storage locations (e.g., 34*m*.3) so as to preserve privacy.

Aside from the end-user devices (e.g., 315, . . . , 31*m*) and the cloud servers (e.g., 340*b*) the system 300 comprises: one or more wired and/or wireless communication fabrics 316, 325, 335 (shown in the form of bidirectional interconnects)

intercoupling the end-user client devices (e.g., 315, . . . , 31m) with the various networked servers (e.g., 336, 340a, 340b, 340').

Still referring to FIG. 3A, a further walk through is provided here with respect to detailed components that may be found in one or more of the mobile devices and/or respective servers. Item 311 represents a first user-activateable software application (first mobile app) that may be launched from within the exemplary mobile client 315 (e.g., a smartphone, but could instead be a tablet, a laptop, a wearable computing device; i.e. smartwatch or other). Item 312 represents a second such user-activateable software application (second mobile app) and generally there are many more. Each end-user installed application (e.g., 311, 312) can come in the form of nontransiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 316, 325, etc. In one embodiment and the case where an order is placed for respective goods and/or services by way of a non-mobile or not normally used client machine (e.g., a desktop computer), the order management server 340b automatically recognizes this condition and uses data available in the customer's profile 34m.1 to access the user's normally carried, personal mobile device and to transfer the assigned T/TID to that normally carried personal mobile device. In this instance, it is understood that appropriate, vendor provided software has been preloaded into the normally carried personal mobile device for securely enabling such transfer of the T/TID to the targeted mobile device. In this way, even if the customer places the order by way of a home desktop computer and then arrives at the venue with his/her normally-used mobile device, the customer tracking subsystem will still work.

More generally, each app (e.g., 311, 312, 317) may come from a different business or other enterprise and may require the assistance of various and different online resources (e.g., Internet, Intranet and/or cloud computing resources). Each enterprise may be responsible for maintaining in good operating order its portions of the system (e.g., local scanners, local servers, Internet, Intranet and/or cloud computing resources). Accordingly, the system 300 is shown as including in at least one server 340', an expert knowledge base 356 which contains various kinds of different expert rules for handling different conditions. One set of expert rules may provide for optimized customer location pinpointing when all the scanners (e.g., 127a-127n) at a given venue or venue observable area 327 are operational. Another set of expert rules may provide for less than optimum but acceptable customer location pinpointing when less than all of the scanners are operational and/or background noise is high. Yet another set of expert rules may provide for variable location determination based on different sets of furniture layout at each respective venue and/or based on expected radio interferences and/or reflections at the given venue. Yet other of the expert rules may relate to categorizing different types of transactions and details about how to handle them, including how to resolve various problematic issues.

In addition to the expert knowledge base 356, one or more other portions of the system 300 may contain interaction tracking resources 351 configured for tracking interactions between customers and respective vendors and an interactions storing database 352 configured for storing and recalling the tracked interactions. In one embodiment, a further database 353 separately keeps track of user accounts. Alternatively, these may be tracked inside the interactions storing database 352. Links 353a (to a further server 340c), 353b, 353c and 353d represent various ways in which the system resources may communicate one with the other.

As mentioned, block 340' is representative of various resources that may be found in client computers and/or the various servers. These resources may include one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-GPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™ and so on). Similarly, the other local resources (only one shown as 348) may operatively couple to various external electromagnetic or other linkages 348a and typically operate in accordance with various ones of predetermined operating protocols. Additionally, various kinds of local software and/or firmware may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

Figure 3B:
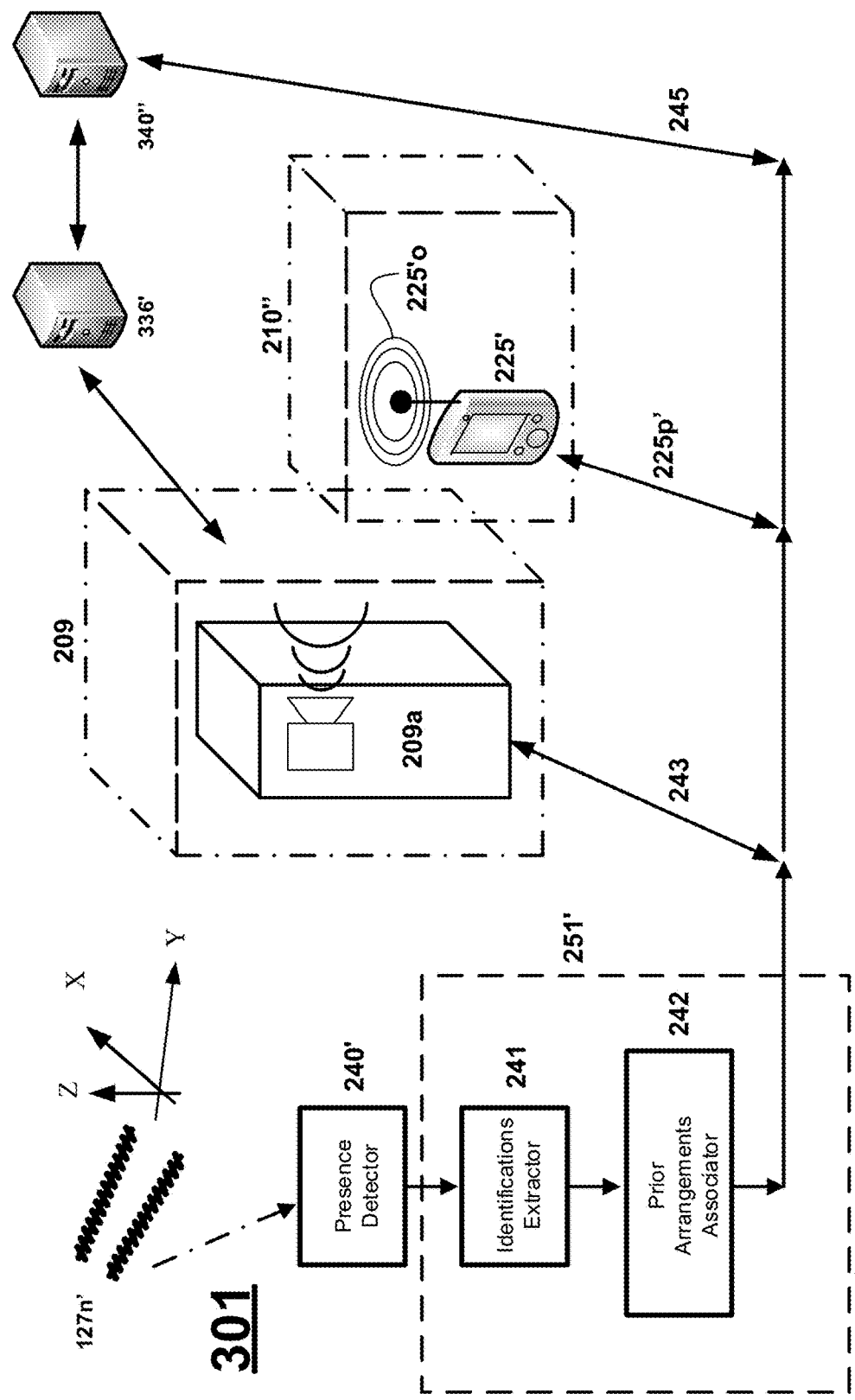
FIG. 3B depicts a system that automatically fetches prior arrangement information relevant to a transaction taking place at a transaction-processing location at which the PAS emitter is operatively present.

FIG. 3B depicts an embodiment 301 that includes a presence detector 240', and identifications extractor 241 and a prior arrangements associate or 242. The presence detector 240' corresponds to the in-region confidence determiner 240 of FIG. 2B. In other words the presence detector 240' relies on correlation of signal characteristics (e.g., RSSI's) of signals received from a plurality of directional antennas 127n' to automatically determine to a relatively high level of confidence (one satisfying a predetermined threshold) that a specific PAS emitter 225' is centered or otherwise disposed within a fine resolution region of interest 210" that is operatively adjacent to a transaction-processing location 209. In the illustrated example, the transaction-processing location 209 includes a bidirectional speaker 209a used for taking verbal orders from customers who come into operative adjacency with the speaker 209a and for verbally confirming the taken orders. In one embodiment, the verbal confirmation includes confirming the price for an ordered set of goods. Although not shown, the transaction-processing location 209 may additionally or alternatively include a touch sensitive computer screen and/or a keyboard or other set of buttons by way of which a customer can manually enter selections based on menu items displayed on the computer screen. The computer screen may display a total price for the ordered items. The display total price may include a price discount based on coupons in possession of the customer that the system 301 learns about.

The identifications extractor 241 and prior arrangements associate or 242 are part of an action-taking module 251' that takes certain predetermined actions in response to the presence detector 240' indicating that the PAS emitter 225' is within the region of interest 210". More specifically, the identifications extractor 241 obtains one or more identifications for the operatively adjacent customer (not shown) and/or for an initial transaction associated with that customer (e.g., a T/TID). The obtained identifications are then forwarded to the prior arrangements associator 242. Associator 242 then responsively makes contact with at least one of an in-cloud server 340" that keeps track of the customer's account and an application or service available in the customer's mobile device 225" for fetching information (T/TID+) about relevant prior arrangements that may have been made for the customer and/or for the transaction about to take place or the transaction that is taking place by way of transaction-processing location 209. In one embodiment, the associator 242 automatically determines what parts if any of the fetched information (T/TID+) relate to the transaction being conducted at the transaction-processing location and which do not. This may done by use of an expert database (e.g., 356 of FIG. 3A) that stores relevancy rules for different kinds of transactions and prior arrangements. The relevant fetched information is then relayed by way of communication path 243 to the transaction-processing location 209 and/or to a local server 336' that manages the transactions taking place by way of the transaction-processing location. That fetched information may include information about price discount coupons or other transaction modifying rights that the customer had previously acquired. The modifications may be applied by the local server 336' and/or by a processor (not shown) inside the transaction-processing location 209. Alternatively or additionally, the prior arrangements associate or 242 may relay an identification (e.g., address) of the transaction-processing location 209 to server 340" by way of communication pathway 245 instructing the in-cloud server 340" to forward the relevant prior arrangement information (e.g., T/TID+) to the local server 336" for processing in the latter. All this can take place automatically in the background without requiring the customer to personally attend to the details, such as providing coupon codes, proof of membership in certain organizations and so on.

The advantages of the present teachings over the art are numerous. It is to be understood that the present teachings are not to be limited to specific disclosed embodiments. In the above description and for sake of simplicity, a fast food restaurant venue is described. However, this disclosure may be applied, but not limited to, theaters (e.g., dinner theaters), stadiums, arenas, train stations, airports, big box store pickup areas and many other venues where it is desirable to track and pinpoint the location of a user of a normally carried and/or worn personal mobile device without encumbering the user to carry other devices not belonging to the user and/or not normally carried by the user.

Figure 4:
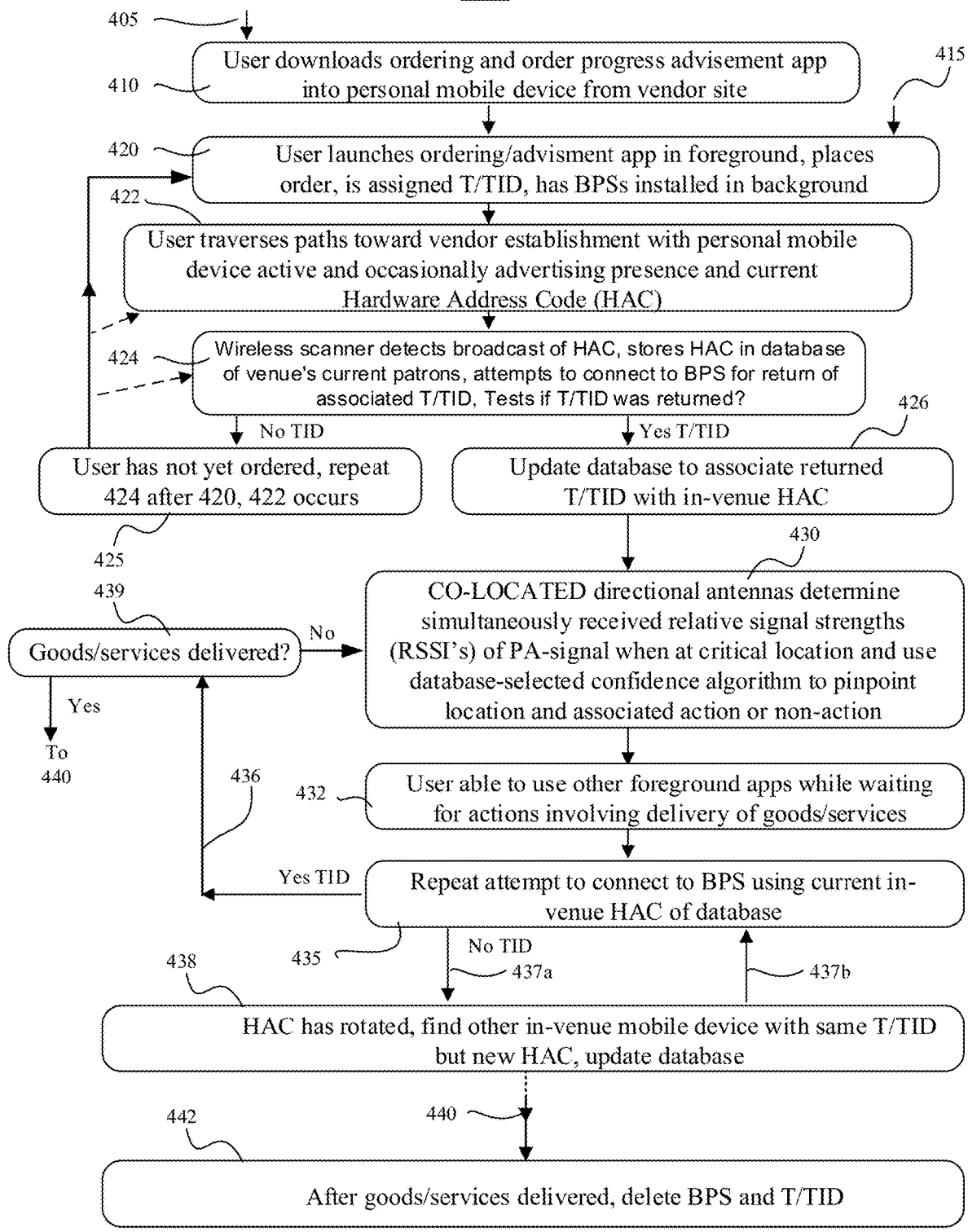
FIG. 4 is a flow chart of a tracking method that includes fine resolution presence detection.

FIG. 4 illustrates a method 400 for pinpointing the location of a PAS emitter. The method includes receiving respective requests (e.g., orders) for corresponding goods and/or services from respective patrons (e.g., 124) when they are at a first position, associating the received orders with a PA-signal broadcast by a PAS emitter (e.g., 125') possessed by the patron when at the first position, preparing to provide the ordered goods and/or services, using the PA-signal to detect presence of respective ones of the patrons at a second position and delivering the corresponding goods and/or services to the respective patrons at the second position.

Entry for first-time use of the method 400 may occur at 405, whereas later entry may occur at 415. In step 410 a user downloads into his/her normally used personal mobile device (e.g., smartphone 315, or a smartwatch or another normally or routinely carried and/or worn personal wireless device) an order or request submitting and progress advisement application (app) that is configured for placing orders or requests to one or more prespecified vendors and/or vendor venues (e.g., fast food establishments, sit-down restaurants, big box store item pickup areas) and for then providing an identified recipient with progress information such as when, where and how to receive the requested goods and/or services. It is within the contemplation of the present disclosure that the order or request submitting portion and the progress advisement portion are provided as two or more separate programs rather than one combined app. The order or request submitting and progress advisement application (app) may be downloaded via the Internet and from one or more vendor-specified websites. In one embodiment, the order or request submitting app may first be downloaded into a desktop or laptop computer of a user and used for ordering where after the progress advisement portion is transferred into a personal mobile device (e.g., 315) of an identified recipient (could be same as the order placer) for execution in that personal mobile device (e.g., 315).

In a subsequent step 420, the user launches the app as a foreground executed process on his/her normally used personal mobile device (e.g., smartphone 315) and, in one embodiment, uses the personal mobile device to order or request various goods and/or services for provisioning at one or more app-compatible vendor venues in accordance with order-placing guidances provided by the app. Typically, the app will cooperate with an in-cloud server and obtain an identification of the user and an identification of a time range in which the user expects provisioning of the ordered goods and/or services to occur. In an alternate embodiment, the user places the order at the venue by way of venue-provided ordering mechanism (e.g., a drive-up microphone into which the user speaks). Once the ordering details are completed and associated with the PA-signal of the user's personal mobile device, the in-cloud server downloads a unique and temporary identification number or other sequence (T/TID) to the personal mobile device (315) where this T/TID is uniquely associated with the specific order and/or transactor. The app also establishes within the user's personal mobile device one or more background peripheral services (BPSs) which may be dynamically connected to by external devices (e.g., the scanners 127a-127n at or near the vendor's venue). When a first of these established BPSs is connected to, and it temporarily awakens, broadcasts a PAS (e.g. Bluetooth™ signal) containing the T/TID that has been assigned to the order and/or transactor and then goes back to sleep. The first BPS does not block the user from accessing foreground applications or services on his/her personal mobile device and does not consume significant battery power. Steps 410 and 420 may be carried out in the user's transport vehicle, home, office or elsewhere as convenient. They need not occur while the user is present in the vendor's scanners-covered establishment. In one embodiment, a second of the BPSs causes the user's mobile device to relay to a vendor accessible server (e.g., 340*b*), current location information of the mobile device as determined based on connection to cellular telephony equipment. In one embodiment, a second of the BPSs causes the user's mobile device to relay to a vendor accessible server, current location information of the mobile device as determined based on received GPS signals.

In step 422 the user (U1) arrives at the establishment and enters a scanners-covered area of the vendor's establishment while carrying his/her normally used mobile device (e.g., smart phone 315). For one class of embodiments (e.g., Apple iPhones™) the operating system (OS) of the mobile device automatically detects presence of external Bluetooth™ devices and occasionally broadcasts its own Bluetooth™ signals to thereby autonomously advertise its presence in the area and declare a current hardware address code (HAC) by way of which the personal device may be addressed. In one embodiment, the OS occasionally changes the HAC by which it is to be addressed.

In step 424 a Bluetooth™ receiver (e.g., one of scanners 127*a*-127*n*) detects the advertised HAC and checks a local database to determine if that HAC is already recorded in an area of the database listing current in-venue HAC's. If not there, the new HAC is added to the current in-venue HAC's listing with a timestamp indicating time of first recognition (e.g., first entry) into the scanned area. Old HAC's having a timestamp earlier than a moving time window may be automatically deleted from the listing by a garbage collecting subroutine.

Also in step 424, the detected HAC is used to address the corresponding personal device and to attempt to dynamically connect to the aforementioned first background peripheral service (BPS) that may have been established inside that personal device. If it is true that the first BPS has been established inside that personal mobile device, the first BPS is temporarily awakened, it responds by transmitting a Bluetooth™ signal including the uniquely-assigned T/TID and then it goes to sleep again.

Step 425 represents the case where the addressed personal mobile device does not return a T/TID (No T/TID). There could be a number of different reasons for this. One of them is that the user has not yet placed an order using the ordering app. Another is that the user may have temporarily shut off his/her personal mobile device and/or temporarily stepped out and away from the scanners-covered area. In such cases control is returned to one of steps 420, 422 and 424 as appropriate. The dashed return lines represent the selective choice of which of steps 422 and 424 is to be returned to based on circumstances.

Step 426 represents the case where the addressed personal mobile device does (Yes) return a T/TID. This condition informs the system that the in-venue and responding personal mobile device (315) has been used for or while placing an order and the returned T/TID identifies that order (and optionally the person who placed the order, when so done and from where and/or who is to be the recipient of the requested goods and/or services). In one embodiment, directional antennas are used to pinpoint the location of the personal mobile device as being within a first region of interest where orders are placed. The local database is then updated to logically associate the current HAC of the responding mobile device with the returned T/TID and with the corresponding order of requested goods and/or services (e.g., as to be provided via pickup window 112).

Step 430 represents the use of co-located directional antennas and respective radio receivers for simultaneously receiving (or receiving at substantially a same time relative to an update rate of the system) the broadcast PA-signals of the user's personal mobile device (315), selecting an appropriate confidence computation process from a database (based on extant context including time and crowding conditions), determining from use of the selected confidence computation process that the user's personal mobile device is isolated within a fine resolution region of interest (e.g., 210' of FIG. 2B) and taking corresponding action; or not taking that action if the computed confidence level is below a predetermined threshold. The determined presence of the user's personal mobile device in the pinpoint location is reported to an order management system. In one embodiment, the order management system tracks movements of the user and/or his/her personal mobile device so as to determine whether the user has settled at a relatively stable waiting location (e.g., seat 122) and what the coordinates of that location are or whether the user is advancing along a physical queue (e.g., 121, 110) towards a quick pickup window (e.g., 112) or counter. The order management system may then dispatch instructions to appropriate human and/or robotic service providers to advance or delay the preparation and/or production of the requested goods and/or services so that provisioning of the goods/services timely intersects with the determined or predicted location of the recipient in accordance with a current provisioning plan. Available level (e.g., fineness of) of location resolution may be dependent on the number of, closeness to each of the other of, and locations of the scanners (127*a*-127*n*) as well as whether all of them are operational, on background noise then present in the scanners-covered area, on signal strength measurement capabilities of the scanners, on radio signal reflection properties of the area, on transmission strengths of respective personal mobile devices of respective users and other factors.

Step 432 represents a waiting time for the being-tracked user (e.g., U1). During this waiting time 432, the user may access and use one or more foreground apps and/or services of his/her personal mobile device while not interfering with the occasional and temporary reawakening's of the T/TID-broadcasting first background peripheral service (BPS). The user-accessible one or more foreground apps and/or services may include games, web browsers, email applications, social media applications and so forth. The user therefore can be entertained or may conduct work tasks while waiting for delivery of the requested goods and/or services. One of the foreground apps and/or services may be the order progress advisement app which advises the user about the progress of, and/or currently planned time, location and method of providing the requested goods and/or services to that user.

While the user is waiting (as represented by step 432), a concurrent and automatically repeated other step 435 attempts to reconnect to the established first BPS of the HAC-addressed personal mobile device so as to again awaken the first BPS, have it repeat its transmission of the corresponding T/TID and then go back to sleep. If in the HAC-addressed personal mobile device responds again with the assigned T/TID (Yes), flow path 436 is taken and as long as the requested goods and/or services have not yet been provided (as determined in step 439), control returns to step 430 from which the loop is repeated as long as a T/TID is returned at step 435. The frequency of repetition of connection re-attempting step 435 may be a variable one. Each time the connection attempt is made and responded to by the user's personal mobile device, battery power is consumed in the mobile device. Thus to minimize consumption of battery charge out of the personal mobile device, the scanning system may intelligently vary the rate of its connection re-attempts 435 based on inferred states of the user. More specifically, if the user appears to be settled into a relatively stable state (e.g., 122) with minimized relocation, the rate of re-attempts can be reduced, for example down to a predetermined minimum rate, to thereby reduce battery consumption in the mobile device. On the other hand, if the user and/or his/her mobile device appear to be still moving/relocating by speeds greater than a predetermined threshold and/or by distances greater than the desired degree of resolution (e.g., 2 feet), then the rate of connection re-attempting 435 may have to be increased, for example up to a predetermined maximum rate for sake of keeping track of where the user is and/or for predicting where the user is heading towards and/or predicting when the user will arrive at a pre-scheduled provisioning spot (e.g., 112).

If the result of reconnection attempting step 435 is that no T/TID is returned, then path 437a is instead taken. For sake of security, some operating systems (e.g., that of the Apple iPhones™) automatically repeatedly change their hardware address code (HAC) on a semi-random basis. Thus, if no T/TID is returned at reconnection attempting step 435, the likelihood is that the targeted personal mobile device has changed (e.g., rotated) its current HAC. The new HAC will have been automatically determined in step 422 (which is carried out repeatedly for sake of finding other in-venue devices) and used for invoking the first BPS of the mobile device, receiving the T/TID and storing the result in the local database. Step 438 represents the recognition that this change of HAC has happened and represents an updating of the database to erase the cross association between the T/TID and the old and now obsolete HAC while reconfiguring the process to instead use the new HAC. Control may then be passed via flow path 437b to step 435 (or alternatively to bypass 435 and proceed along flow path 436) so the loop continues until the order management system determines at step 439 that the goods and/or services have been provided to the tracked user.

After the requested goods and/or services have been satisfactorily provided to the tracked user, flow path 440 is followed to step 442 where the tracking BPSs are automatically deleted from the user's personal mobile device and the T/TID is automatically deleted from the local database. This deletion step 442 assures that the BPSs and T/TID are ephemeral objects which disappear after the order has been fulfilled. As a result, the system stops tracking the user because no T/TID is returned when step 424 later attempts to reconnect to that personal mobile device. The user's privacy is therefore secured in that the details of the delivered order can no longer be found using the temporarily assigned T/TID.

Figure 5A:
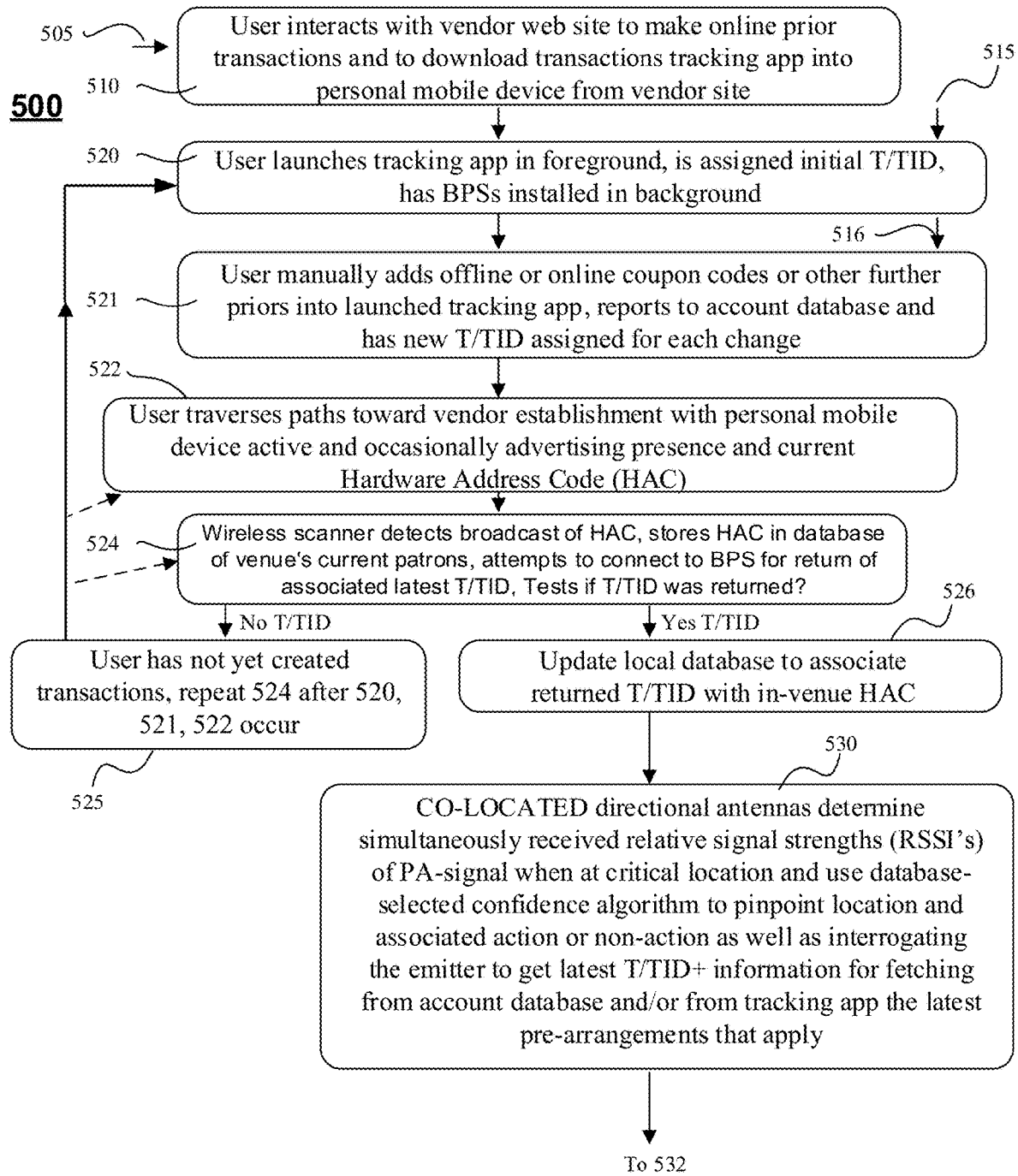
FIGS. 5A-5B provide a flow chart of a method of automatically associating prior arrangements with a transaction taking place at a transaction-processing location.
Figure 5B:
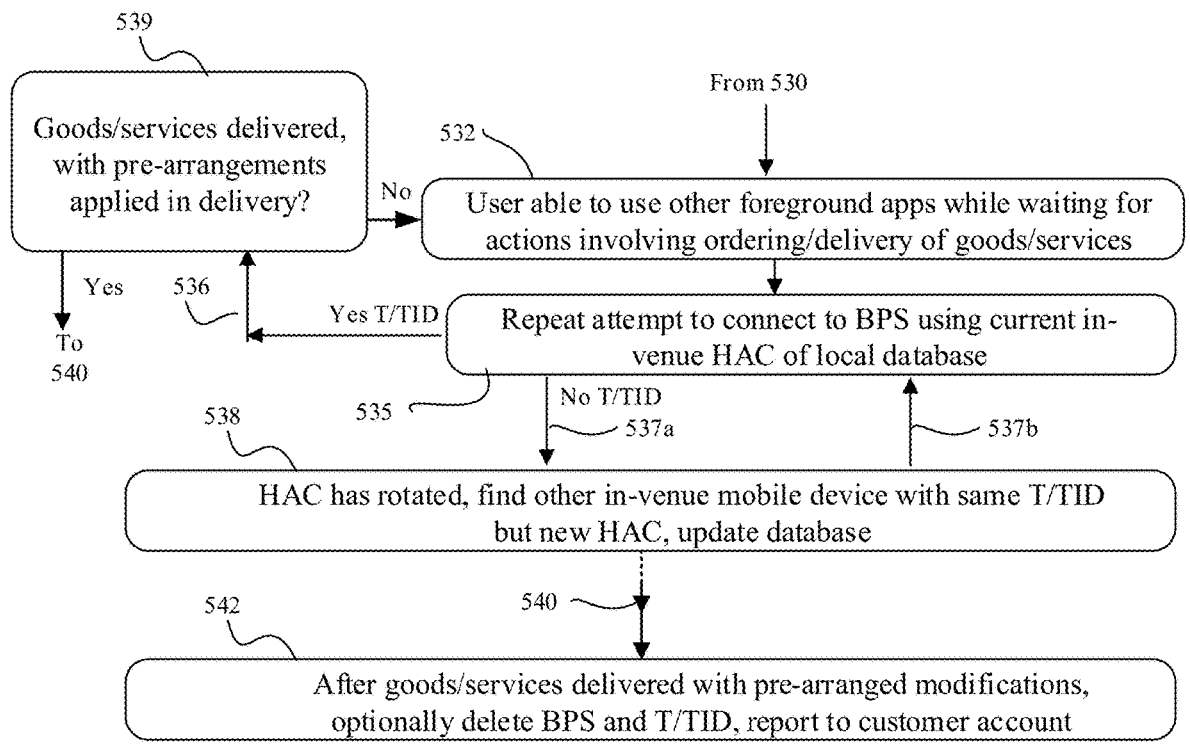

FIGS. 5A-5B provide a flowchart with steps similar to that of FIG. 4 except that the steps are enumerated in the 500 century series rather than in the 400 series. As such, those of the steps that are substantially similar will not be explained in detail here. Instead, the differences will be explicated. In step 510, the vendor provides a transactions tracking application that keeps track of various transactions related to one or both of a specific transactor and/or to a specific set of interrelated transactions. The transactor and/or co-related set of transactions are assigned an initial transactor/transactions identification (could be a unique number or other unique set of symbols) in step 520 when the application is launched. However, at a later time and in step 521 the user may add additional co-related transactions to the initial set. For example, the user may find an online coupon offer for a price discount whose coupon code the user copies into the tracking application. Alternatively the user may find an off-line coupon offer in a newspaper or the like where the user copies that coupon code into the tracking application. The tracking application may at that time connect to an in-cloud service that updates the user's customer account for the associated vendor by adding the newly found coupon or coupons. In response, the in-cloud service assigns a new and unique T/TID that associates with the updated set of transactions. Alternatively, the tracking application may not connect to the in cloud service and instead stores internally within a local memory (e.g., in the user's smart phone) a specification for the added coupons or other transactions. In that case, the initial T/TID assigned by the in-cloud service remains unchanged. The combination of the current T/TID and specification of further transactions added to the initial set is referred to here as T/TID+ where the plus ("+") information can be contained either in a database accessed by the in cloud service and/or in a local memory maintained by the user's mobile device (e.g., smart phone).

In subsequent step 530 where the user has entered the premises of a provider associated with the transactions developed previously, for example in steps 510 and 521, the PA-signal of the user's mobile device is detected by the two or more co-located directional antennas as being in a fine resolution region adjacent to a transaction-processing spot (pinpointed location) and the latest T/TID+ information is obtained based on the detected PA-signal and further information stored in the mobile device by the transactions tracking application and/or stored in the in-cloud database (the portion tracking the customer's various transactions for the associated vendor). The obtained T/TID+ information is then processed to determine which if any prior arrangements made by or for the transactor and/or for the initial set of transactions are to be automatically applied for a transaction taking place at the transaction-processing spot. The relevant prior arrangements are then applied to a transaction being conducted at the transaction-processing spot. For example, if the spot is a verbal order taking location, the previously acquired discount coupons of the user are automatically applied and optionally the user is automatically informed of the fact that they are being applied. The remaining steps of FIGS. 5A-5B are substantially similar to those of FIG. 4 except that in step 539 the corresponding goods and/or services are delivered with the pre-arrangements associated with the obtained T/TID+ information being automatically applied during the delivery process.

In accordance with various embodiments of the present disclosure, the methods described herein may be implemented using one or more hardware computer systems that execute software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a digital processor of a digital programmable computer or other programmable data processing apparatus to produce a machine, such that the instructions, which execute via the processor of the computer or other programmable instruction execution apparatus, create a mechanism for implementing the functions/acts specified in the flowchart and/or block diagram block or blocks. All instructions need not be executed by the same one processor and can instead be distributed among a plurality of operatively cooperative processors. The terminology, 'at least one processor' as used herein is to be understood as covering both options, namely having one processor execute the all instructions or distributing the instructions for execution by two or more processors.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously or on an interrupted multi-tasking basis and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claimed subject matter.

What is claimed is:

1. A method that includes automatically associating prior arrangements with a transaction conducted by way of a transaction-processing location, the method comprising:
    automatically determining a degree of correlation between respective reception characteristics of two or more respective radio presence advertising signals (PA-signals or PAS's) respectively received at a substantially same time by two or more of co-located directional antennas aimed to cover a fine resolution region of interest within or operatively adjacent to the transaction-processing location;
    automatically determining a confidence level based on the degree of correlation between the respective reception characteristics of the two or more respective radio presence advertising signals;
    in response to the determined confidence level satisfying a predetermined threshold, obtaining from a PAS emitter of the received PA-signals, at least one of an identification of a transactor associated with the PAS emitter or an identification of at least one transaction associated with the PAS emitter;
    using at least one of the one or more identifications obtained from the PAS emitter to obtain specifications for prior arrangements made in association with the transaction conducted by way of the transaction-processing location; and
    automatically applying to the transaction conducted by way of the transaction-processing location, those of the obtained prior arrangements that relate to the transaction.

2. The method of claim 1, wherein:
the respective reception characteristics of the two or more of the respective radio PA-signals include respective signal strengths received by way of the two or more of the co-located directional antennas.

3. The method of claim 1, wherein:
the transaction-processing location is one at which a transactor manually defines at least part of the transaction conducted by way of the transaction-processing location.

4. The method of claim 3, wherein:
the manually defining at the transaction-processing location includes providing a verbal definition of at least part of the transaction.

5. The method of claim 4, wherein:
the verbal definition specifies a product to be provided at a location visited subsequent to presence at the transaction-processing location.

6. The method of claim 3, wherein:
the manually defining at the transaction-processing location includes providing a menu-based selection action.

7. The method of claim 6, wherein:
the menu-based selection action includes interfacing with a touch sensitive screen.

8. The method of claim 1, wherein:
the associated prior arrangements include previously acquired rights to a price discount.

9. The method of claim 1, wherein:
the associated prior arrangements include previously acquired rights to redeem loyalty points.

10. The method of claim 1, wherein:
the associated prior arrangements include previously acquired rights to obtain loyalty points.

11. The method of claim 1, wherein:
the associated prior arrangements include previously acquired rights to discounts and/or other special treatment based on having membership in a specific organization.

12. The method of claim 1, wherein:
the associated prior arrangements include previously acquired rights to enhanced product size or quality or added products/services without price increase due to acquired coupons and/or memberships.

13. The method of claim 1, wherein:
the associated prior arrangements include previously acquired rights to specially-sped up delivery of goods and/or services.

14. The method of claim 1, wherein:
the associated prior arrangements include previously acquired rights to enhanced products/service due to a winning engagement in an online game of chance.

15. The method of claim 1, wherein:
the transaction-processing location is one at which a transactor manually defines at least part of the transaction conducted at the transaction-processing location by modifying an order that was previously recorded and the associated prior arrangements include those established in the previous recording of the order.

16. A method that includes automatically associating prior arrangements with a transaction conducted by way of a transaction-processing location, the method comprising:
receiving at two or more co-located directional antennas, radio presence advertising signals (PA-signals or PAS's) repeatedly broadcast from a PAS emitter and relaying the received signals to one or more respective radio receivers used for the co-located directional antennas, the co-located directional antennas being directed to cover a predetermined fine resolution region of interest within or operatively adjacent to the transaction-processing location;
in the respective one or more radio receivers, determining corresponding signal reception characteristics of the radio PA-signals that were received at a substantially same time by two or more of the co-located directional antennas;
automatically determining a degree of correlation between corresponding ones of the determined signal reception characteristics of at least one pair of the two or more respective radio PA-signals that were received at a substantially same time by two or more of the co-located directional antennas;
automatically determining a confidence level based on the degree of correlation between the respective reception characteristics of the two or more respective radio presence advertising signal s;
in response to the determined confidence level satisfying predetermined criteria, obtaining, as an identification and from the PAS emitter at least one of a first identification of a transactor associated with the PAS emitter or a second identification of at least one transaction associated with the PAS emitter;
using the identification obtained from the PAS emitter to obtain specifications for prior arrangements made in association with the transaction conducted by way of the transaction-processing location; and
automatically applying to the conducted transaction those of the obtained prior arrangements that relate to the conducted transaction.

17. A machine system that automatically associates prior arrangements with a transaction conducted by way of a transaction-processing location, the system comprising:
two or more co-located directional antennas structured to receive radio presence advertising signals (PA-signals or PAS's) repeatedly broadcast from a radio PAS emitter and to relay the received signals to one or more respective radio receivers used for demodulating the received signals, the co-located directional antennas being directed to cover a predetermined fine resolution region of interest within or operatively adjacent to the transaction-processing location;
respective signal strength measuring circuits in the respective one or more radio receivers, the measuring circuits structured to determine corresponding strengths of the radio PA-signals that were received at a substantially same time by two or more of the co-located directional antennas;
a processor; and
one or more non-transitory computer-readable media storing computer-executable instructions that, when executed, cause the system to perform operations comprising:
generating from the determined strengths, a current strength difference signal for at least one pair of the two or more respective radio PA-signals that were received at a substantially same time by two or more of the co-located directional antennas, the generated current strength difference signal indicating a difference between a first of the determined corresponding strengths, that is optionally weighted, and a second of the determined corresponding strengths, that is optionally weighted;
automatically generating, using the generated current strength difference signal, a degree of correlation signal;
automatically determining a confidence level based on the degree of correlation signal, the confidence level indicating the likelihood of presence of the radio PAS emitter within the predetermined fine resolution region of interest;
obtaining from the PAS emitter at least one of an identification of a transactor associated with the PAS emitter or an identification of at least one transaction associated with the PAS emitter in response to the generated degree of correlation signal satisfying predetermined criteria;
using one or more of the identifications obtained from the PAS emitter while it is determined to be located in the fine resolution region and to associate specifications for prior arrangements made in association with a transaction conducted by way of the transaction-processing location; and
automatically applying to the transaction conducted by way of the transaction-processing location, those of the associated prior arrangements that relate to the conducted transaction.

18. The system of claim 17, the operations further comprising:
generating from the determined strengths, a current over-time averaged strength signal for the received signals, the generated current over-time averaged strength signal indicating a current average value for two or more and optionally weighted ones of the determined strengths; and
wherein generating the degree of correlation signal includes generating the degree of correlation signal using the generated current over-time averaged strength signal.

19. The system of claim 18 wherein:
the generated degree of correlation signal is a normalized one that is derived from a ratio having the generated current strength difference signal on one side of the ratio and having the generated current over-time averaged strength signal on an opposed side of the ratio.

20. A computer system comprising one or more processors and a memory having collectively stored therein instructions that, when executed by the one or more processors, cause the one or more processors to determine a likelihood of presence of a radio PAS emitter (a presence advertising signal emitter) within a predetermined fine resolution region of interest and to fetch prior arrangement information corresponding to the determined presence, the executed instructions comprising:
- obtaining from a respective one or more radio receivers, reception characteristic data representing corresponding reception characteristics of radio PA-signals (presence advertising signals) received at a substantially same time by two or more of co-located directional antennas, the received radio PA-signals being those repeatedly broadcast from the radio PAS emitter and relayed to the one or more respective radio receivers that are operatively coupled to the co-located directional antennas, the co-located directional antennas being directed to cover the predetermined fine resolution region of interest;
- automatically generating, from the obtained reception characteristic data, a degree of correlation;
- automatically determining a confidence level based on the degree of correlation, the confidence level indicating a likelihood of presence of the radio PAS emitter being within the predetermined fine resolution region of interest; and
- responsive to the confidence level satisfying predetermined criteria:
  - fetching, from the radio PAS emitter, at least one of an identification of a transactor associated with the radio PAS emitter or prior arrangement information corresponding to a transaction conducted in operative proximity to the fine resolution region of interest; and
  - applying the fetched information so as to modify the conducted transaction in accordance with the fetched prior arrangement information.

* * * * *